(12) United States Patent
Ramasubramonian et al.

(10) Patent No.: US 12,293,554 B2
(45) Date of Patent: May 6, 2025

(54) PREDICTION FOR GEOMETRY POINT CLOUD COMPRESSION

(71) Applicant: QUALCOMM Incorporated, San Diego, CA (US)

(72) Inventors: Adarsh Krishnan Ramasubramonian, Irvine, CA (US); Geert Van der Auwera, San Diego, CA (US); Luong Pham Van, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 18/155,480

(22) Filed: Jan. 17, 2023

(65) Prior Publication Data

US 2023/0230290 A1    Jul. 20, 2023

Related U.S. Application Data

(60) Provisional application No. 63/300,959, filed on Jan. 19, 2022.

(51) Int. Cl.
*H04N 19/172* (2014.01)
*G06T 9/00* (2006.01)
(Continued)

(52) U.S. Cl.
CPC ............... *G06T 9/40* (2013.01); *G06T 9/004* (2013.01); *H04N 19/105* (2014.11);
(Continued)

(58) Field of Classification Search
CPC ........... G06T 9/40; G06T 9/004; G06T 9/001; G06T 9/00; G06T 2207/10028;
(Continued)

(56) References Cited

U.S. PATENT DOCUMENTS

| 11,531,113 | B1 * | 12/2022 | Bristow | ................. G06V 20/58 |
| 2019/0116357 | A1 * | 4/2019 | Tian | ........................ H04N 19/14 |
| 2024/0135592 | A1 * | 4/2024 | Xu | ........................... G06T 9/004 |

OTHER PUBLICATIONS

De Queiroz et al., Distance-Based Probability Model for Octree Coding, Apr. 5, 2018 [retrieved Dec. 11, 2024], IEEE Signal Processing Letters, vol. 25, issue: 6, pp. 739-742. DOI: 10.1109/LSP.2018.2823701 (Year: 2018).*

(Continued)

*Primary Examiner* — Henok Shiferaw
*Assistant Examiner* — Dennis Rosario
(74) *Attorney, Agent, or Firm* — Shumaker & Sieffert, P.A.

(57) ABSTRACT

A method comprises: for each of a plurality of dimensions: identifying a reference position for the dimension, the reference position for the dimension being a position in a reference frame for the respective dimension, and the reference frame for the respective dimension and a reference frame for at least one other dimension in the plurality of dimensions being different reference frames in a plurality of reference frames; identifying an inter predictor for the respective dimension, wherein a predictor has a coordinate value in the respective dimension corresponding to a coordinate value in the respective dimension of the inter predictor for the respective dimension; and encoding or decoding the current point based on the predictor.

30 Claims, 21 Drawing Sheets

(51) Int. Cl.
| | |
|---|---|
| *G06T 9/40* | (2006.01) |
| *H04N 19/105* | (2014.01) |
| *H04N 19/159* | (2014.01) |
| *H04N 19/44* | (2014.01) |
| *H04N 19/50* | (2014.01) |
| *G06T 17/00* | (2006.01) |
| *G06V 20/56* | (2022.01) |
| *H04N 19/96* | (2014.01) |

(52) U.S. Cl.
CPC ......... *H04N 19/159* (2014.11); *H04N 19/172* (2014.11); *H04N 19/44* (2014.11); *H04N 19/50* (2014.11); *G06T 17/005* (2013.01); *G06T 2207/10028* (2013.01); *G06V 20/56* (2022.01); *H04N 19/96* (2014.11)

(58) Field of Classification Search
CPC ....... G06T 17/005; G06T 17/00; H04N 19/70; H04N 19/597; H04N 19/96; H04N 19/54; H04N 19/105; H04N 19/172; H04N 19/44; H04N 19/159; H04N 19/52; H04N 19/593; H04N 19/517; H04N 19/503; H04N 19/167; H04N 19/107; H04N 19/61; H04N 13/161; H04N 19/109; H04N 19/50; G06N 3/0455; G06V 20/58; G06V 10/467; G06V 20/588; G06V 20/80; G06V 20/52; G06V 20/53; G06V 20/54; G06V 20/582; G06V 20/584; G06V 20/586; G06V 20/593; G06V 20/597; G06V 20/59; G06V 20/56; G06V 20/50; G06V 20/62; G06V 20/60; G06V 20/625; G06V 20/63; G06V 20/635; G06V 20/64
See application file for complete search history.

(56) References Cited

OTHER PUBLICATIONS

International Search Report and Written Opinion—PCT/US2023/060835—ISA/EPO—May 3, 2023
Mongus D., et al., "Efficient Method for Lossless LIDAR Data Compression", International Journal of Remote Sensing, vol. 32, No. 9, Apr. 29, 2011, pp. 2507-2518, XP093029682.
"Technologies under Consideration in G-PCC", 136th MPEG Meeting, Oct. 11, 2021-Oct. 15, 2021, Online, (Motion Picture Expert Group or ISO/IEC JTC1/SC29/WG11), No. n20999, Jan. 4, 2022, XP030302438, 61 Pages.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

* cited by examiner

- ⊖ Root vertex
- ◯ Branch vertex with 1 child
- ⊕ Branch vertex with 2 children
- ⊘ Branch vertex with 3 children
- ⓘ Leaf vertex

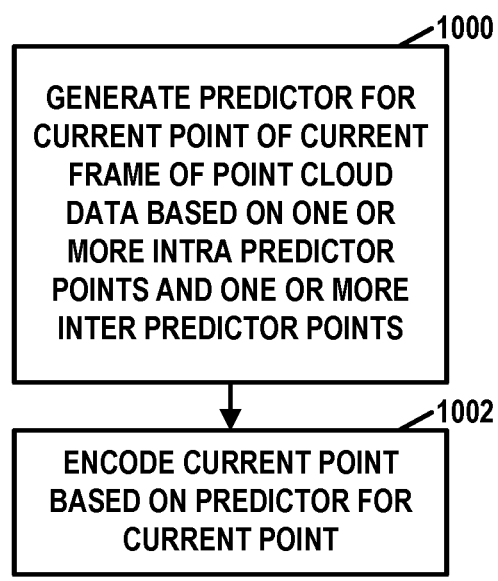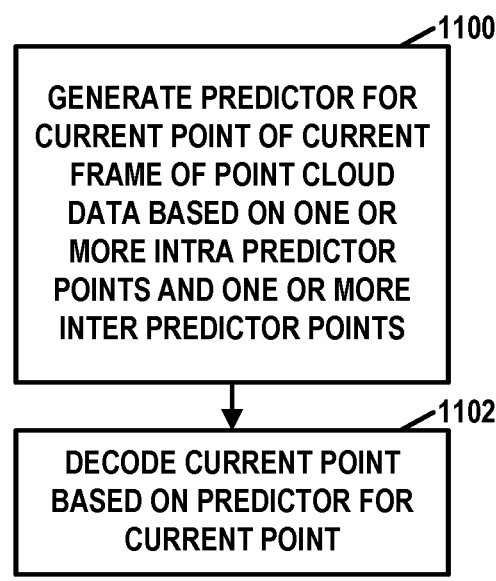
FIG. 10
FIG. 11

ENCODER

DECODER

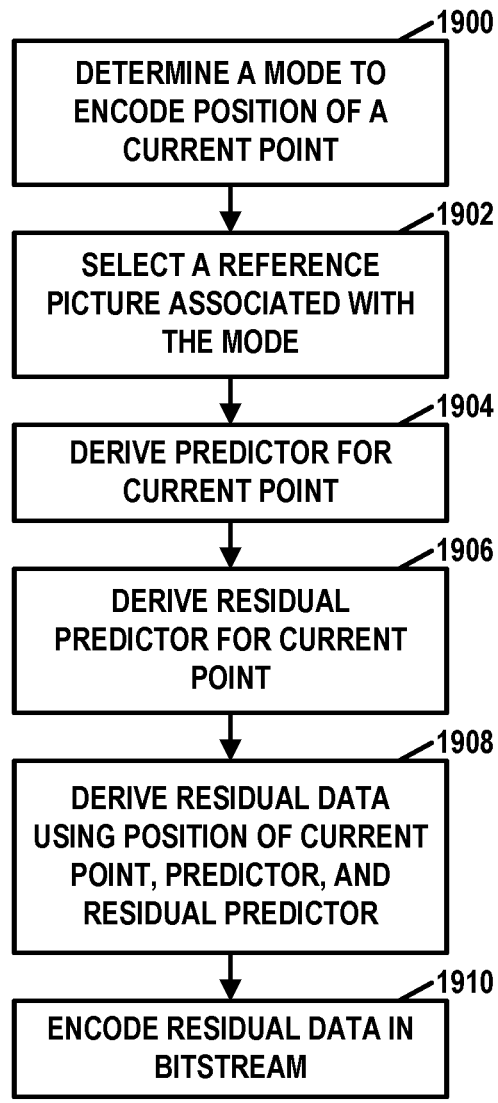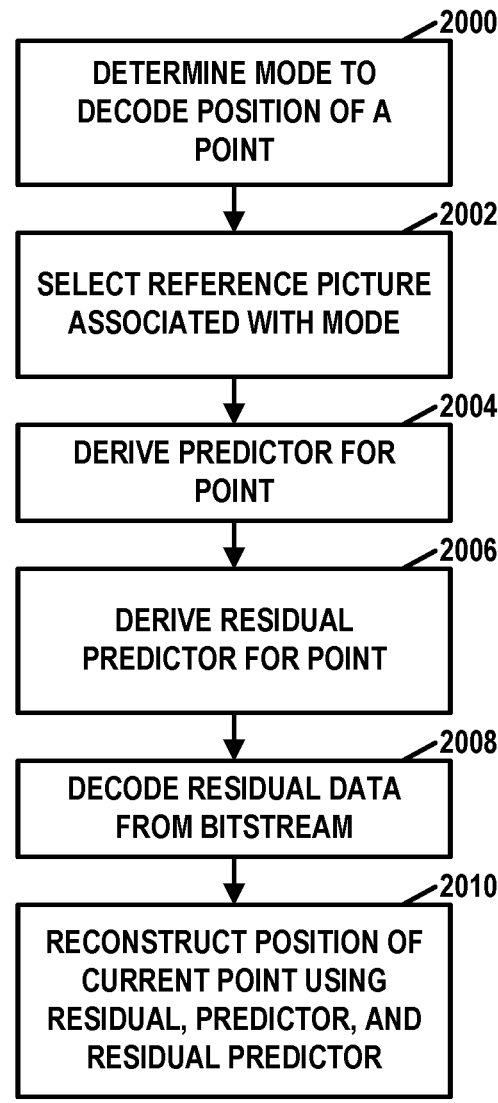
FIG. 19
FIG. 20

PREDICTION FOR GEOMETRY POINT CLOUD COMPRESSION

This application claims the benefit of U.S. Provisional Patent Application 63/300,959, filed Jan. 19, 2022, the entire content of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes inter-prediction and residual prediction techniques for point cloud compression. In point cloud compression, an encoder or a decoder may determine an inter predictor for a current point in a current frame of point cloud data based on a point in a reference frame of the point cloud data. The encoder or decoder may encode or decode the current point based on the inter predictor for the current point. The position of the inter predictor is defined in a coordinate system in terms of a set of coordinate values. Each of the coordinate values corresponds to a different dimension. In accordance with some examples of this disclosure, an encoder or a decoder may use different reference frames to determine different coordinate values of an inter predictor. Using different reference frames to determine different coordinate values of an inter predictor may increase compression efficiency because coordinate values corresponding to some dimensions may better match the current point in some reference frames than other reference frames. For example, in a distance, azimuth, laser identifier coordinate system, a zero-compensated reference frame may produce better compression for azimuth and laser identifier coordinate values than a global motion compensated reference frame while the global compensated reference frame may produce better compression for distance (radius) than the zero-compensated reference frame.

Thus, in accordance with an example of this disclosure, an encoder or decoder may generate a predictor for a current point of a current frame of the point cloud data. As part of generating the predictor for the current point, the encoder or decoder may, for each respective dimension of a plurality of dimensions of a point coordinate system, identify a reference position for the respective dimension. The reference position for the respective dimension is a position in a reference frame for the respective dimension and may have a laser identifier and a scaled azimuth matching a laser identifier and an azimuth of the previous point in the current frame. The reference frame for the respective dimension and a reference frame for at least one other dimension in the plurality of dimensions are different reference frames in a plurality of reference frames. The encoder or decoder may identify an inter predictor for the respective dimension. The inter predictor for the respective dimension is a next point in the reference frame for the respective dimension having a scaled azimuth greater than the scaled azimuth of the reference position for the respective dimension. A predictor for the current point has a coordinate value in the respective dimension corresponding to a coordinate value in the respective dimension of the inter predictor for the respective dimension. The encoder or decoder may encode or decode the current point based on the predictor for the current point.

In one example, this disclosure describes a method of encoding or decoding a point cloud data, the method comprising: generating a prediction for a point of the point cloud data based on one or more intra predictor points and one or more inter predictor points; and encoding or decoding the point based on the prediction for the point.

In another example, this disclosure describes a method of encoding or decoding point cloud data, the method comprising: obtaining a mixed reference frame based on one or more reference frames; adding a point in the mixed reference frame for a point in a reference frame of the one or more reference frames; performing inter prediction using the added point to generate a prediction for a point of the point cloud data; and encoding or decoding the point based on the prediction for the point.

In another example, this disclosure describes a method of encoding or decoding point cloud data, the method comprising: deriving a predictor from a reference picture and a predictor type; and determining, based on the predictor, an inter residual value for a point of a current point cloud frame of the point cloud data.

In another example, this disclosure describes a method of encoding or decoding point cloud data, the method comprising: determining a mode to encode or decode a position of a point; determining a reference picture associated with the mode; determining a predictor value for the point; and determining a residual predictor value for the point.

In another example, this disclosure describes a device for processing a point cloud, the device comprising one or more means for performing any method of this disclosure.

In another example, this disclosure describes a computer-readable storage medium having stored thereon instructions that, when executed, cause one or more processors to perform any of the methods of this disclosure.

In another example, this disclosure describes a device for decoding point cloud data, the device comprising: a memory configured to store the point cloud data; and one or more processors implemented in circuitry and coupled to the memory, the one or more processors configured to: generate a predictor for a current point of a current frame of the point cloud data, wherein the predictor for the current point is a prediction of a location of the current point and the one or more processors are configured to, as part of generating the predictor for the current point, for each respective dimension of a plurality of dimensions of a point coordinate system: identify a reference position for the respective dimension, wherein: the reference position for the respective dimension is a position in a reference frame for the respective dimension, and the reference frame for the respective dimension and a reference frame for at least one other dimension in the plurality of dimensions are different reference frames in a plurality of reference frames; and identify an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and decode the current point based on the predictor for the current point.

In another example, this disclosure describes a device for encoding point cloud data, the device comprising: a memory configured to store the point cloud data; and one or more processors implemented in circuitry and coupled to the memory, the one or more processors configured to: generate a predictor for a current point of a current frame of the point cloud data, wherein the one or more processors are configured to, as part of generating the predictor for the current point, for each respective dimension of a plurality of dimensions of a point coordinate system: identify a reference position for the respective dimension, wherein: the reference position for the respective dimension is a position in a reference frame for the respective dimension, and the reference frame for the respective dimension and a reference frame for at least one other dimension in the plurality of dimensions are different reference frames in a plurality of reference frames; and identify an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and encode the current point based on the predictor for the current point.

In another example, this disclosure describes a method of decoding point cloud data, the method comprising: generating a predictor for a current point of a current frame of the point cloud data, wherein generating the predictor for the current point comprises, for each respective dimension of a plurality of dimensions of a point coordinate system: identifying a reference position for the respective dimension, wherein: the reference position for the respective dimension is a position in a reference frame for the respective dimension, and the reference frame for the respective dimension and a reference frame for at least one other dimension in the plurality of dimensions are different reference frames in a plurality of reference frames; and identifying an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and decoding the current point based on the predictor for the current point.

In another example, this disclosure describes a method of encoding point cloud data, the method comprising: generating a predictor for a current point of a current frame of the point cloud data, wherein the one or more processors are configured to, as part of generating the predictor for the current point, for each respective dimension of a plurality of dimensions of a point coordinate system: identify a reference position for the respective dimension, wherein: the reference position for the respective dimension is a position in a reference frame for the respective dimension, and the reference frame for the respective dimension and a reference frame for at least one other dimension in the plurality of dimensions are different reference frames in a plurality of reference frames; and identify an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and encode the current point based on the predictor for the current point.

The details of one or more examples are set forth in the accompanying drawings and the description below. Other features, objects, and advantages will be apparent from the description, drawings, and claims.

BRIEF DESCRIPTION OF DRAWINGS

FIG. 10 is a flowchart illustrating an example operation of a G-PCC encoder that uses mixed intra/inter prediction according to techniques of this disclosure.

FIG. 11 is a flowchart illustrating an example operation of a G-PCC decoder that uses mixed intra/inter prediction according to techniques of this disclosure.

FIG. 19 is a flowchart that illustrates an example of how residual prediction may be used to encode the point position in accordance with one or more techniques of this disclosure.

FIG. 20 is a flowchart that illustrates an example of how residual prediction may be used to decode the point position in accordance with one or more techniques of this disclosure.

DETAILED DESCRIPTION

Figure 1:
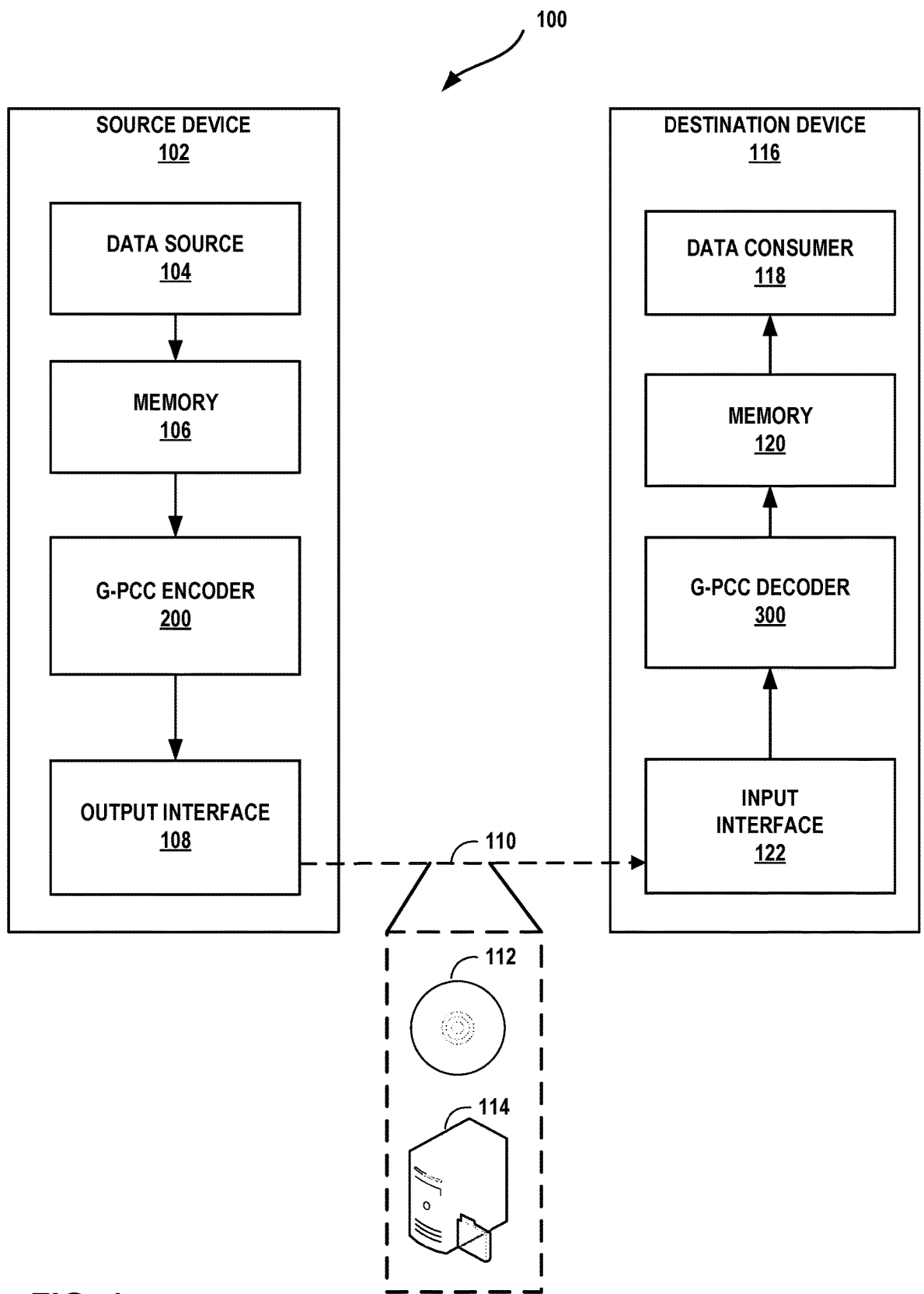
FIG. 1 is a block diagram illustrating an example encoding and decoding system that may perform the techniques of this disclosure.

Point cloud data includes data that represent positions of points in a point cloud. Frames of point cloud data may represent positions of points at different moments in time. Frames may also be referred to as "pictures." Point cloud encoding is a process that encodes point cloud data to reduce the amount of data required to represent the positions of points in a point cloud. Point cloud decoding is a process that reconstructs the point cloud data from encoded point cloud data. Inter prediction and intra prediction are two techniques that may be used in point cloud encoding and point cloud decoding.

Intra prediction is a technique in which an encoder or decoder predicts a position of a point in a current frame based on a position of another point in the current frame. For instance, an encoder may signal residual data indicating a difference between an actual position of a point of a current frame and a position of a previously encoded point of the current frame. A decoder may use the residual data to reconstruct the actual position of the point.

Inter prediction is a technique in which an encoder or decoder predicts a position of a point in a current frame based on one or more reference points in a reference frame. An encoder may signal residual data indicating differences between an actual position of a point and the predicted position of the point. A decoder may use the residual data and the predicted position of the point to reconstruct the actual position of the point.

In some point cloud coding CODECs, there are two types of reference frames: global motion compensated reference frames and zero-compensated reference frames. A global motion compensated reference frame is a reference frame that has been compensated using global motion estimation. For example, if a point cloud is generated based on measurements obtained from a spinning light detection and ranging (LIDAR) device mounted on a moving vehicle, the points corresponding to traffic signs or other stationary objects may all appear to move in the same direction from one frame to the next as the vehicle moves down a roadway. Thus, global motion compensated reference frames may be advantageous when representing areas that are moving in a consistent direction relative to the LIDAR device. Zero-compensated reference frame is a reference frame that has not been compensated using global motion estimation. Use of a zero-compensated reference frame may be advantageous for encoding points that are not subject to global motion. For example, if a point cloud is generated based on measurements obtained from a spinning LIDAR device mounted on a moving vehicle, the points corresponding a flat surface of a roadway are not substantially different from one frame to the next, despite representing different actual locations on the roadway.

A location of a point may be identified using a set of coordinate values belonging to a coordinate system. For example, a coordinate system may identify a location of a point using a radius coordinate, an azimuth coordinate, and a laser identifier (ID) coordinate. In another example, a coordinate system may identify a location of a point using cartesian coordinates (e.g., x, y, and z). In another example, a coordinate system may identify a location of a point using spherical coordinates (e.g., r, phi, and theta).

Zero-compensated reference frames and global motion compensated reference frames may be advantageous for different purposes. A frame may include some points that may be more efficiently encoded based on a zero-compensated reference frame and some points that may be more efficiently encoded using a global compensated reference frame. Conventional techniques for inter prediction of point cloud data only permit the use of a single reference frame for encoding points in a current frame.

This disclosure describes techniques for point cloud encoding or decoding that may improve compression performance. As described herein, an encoder or a decoder may use different reference frames to determine different coordinate values of an inter predictor. The predictor for the current point may be a prediction of a location of the current point. Thus, in accordance with an example of this disclosure, for each respective dimension of a plurality of dimensions of a point coordinate system, the encoder or decoder may identify a reference position for the respective dimension. The dimensions may be components of coordinates in the point coordinate system used to identify a location of a point. For instance, the dimensions may include x, y, and z dimensions for a cartesian coordinate system, radius, phi, and elevation (or laser ID) in a spherical coordinate system, and so on. The reference position for the respective dimension is a position in a reference frame for the respective dimension and may have a laser identifier and a scaled azimuth matching a laser identifier and an azimuth of the previous point in the current frame. The reference frame for the respective dimension and a reference frame for at least one other dimension in the plurality of dimensions are different reference frames in a plurality of reference frames. The encoder or decoder may identify an inter predictor for the respective dimension. The inter predictor for the respective dimension may be a point in the reference frame for the respective dimension having a scaled azimuth greater than the scaled azimuth of the reference position for the respective dimension (or an azimuth greater than the azimuth of the reference position for the respective dimension). A predictor for the current point has a coordinate value in the respective dimension corresponding to a coordinate value in the respective dimension of the inter predictor for the respective dimension. The encoder or decoder may encode or decode the current point based on the predictor for the current point. Using different reference frames to generate the inter predictor for the current point in this way may improve compression efficiency.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to inter-prediction for point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to inter-prediction for point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a LIDAR device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud (i.e., point cloud data).

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is developing point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds).

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
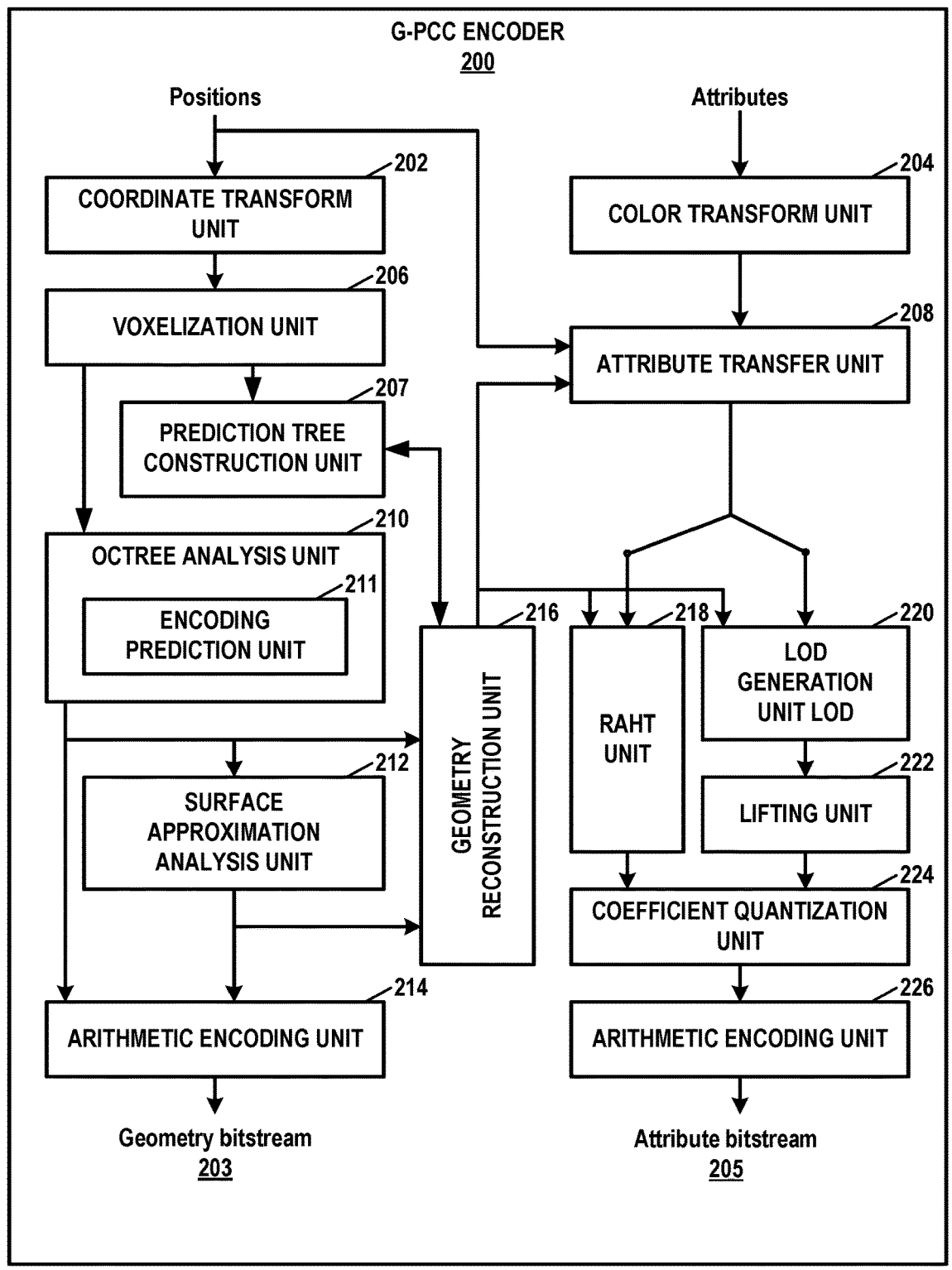
FIG. 2 is a block diagram illustrating an example Geometry Point Cloud Compression (G-PCC) encoder according to techniques of this disclosure.
Figure 3:
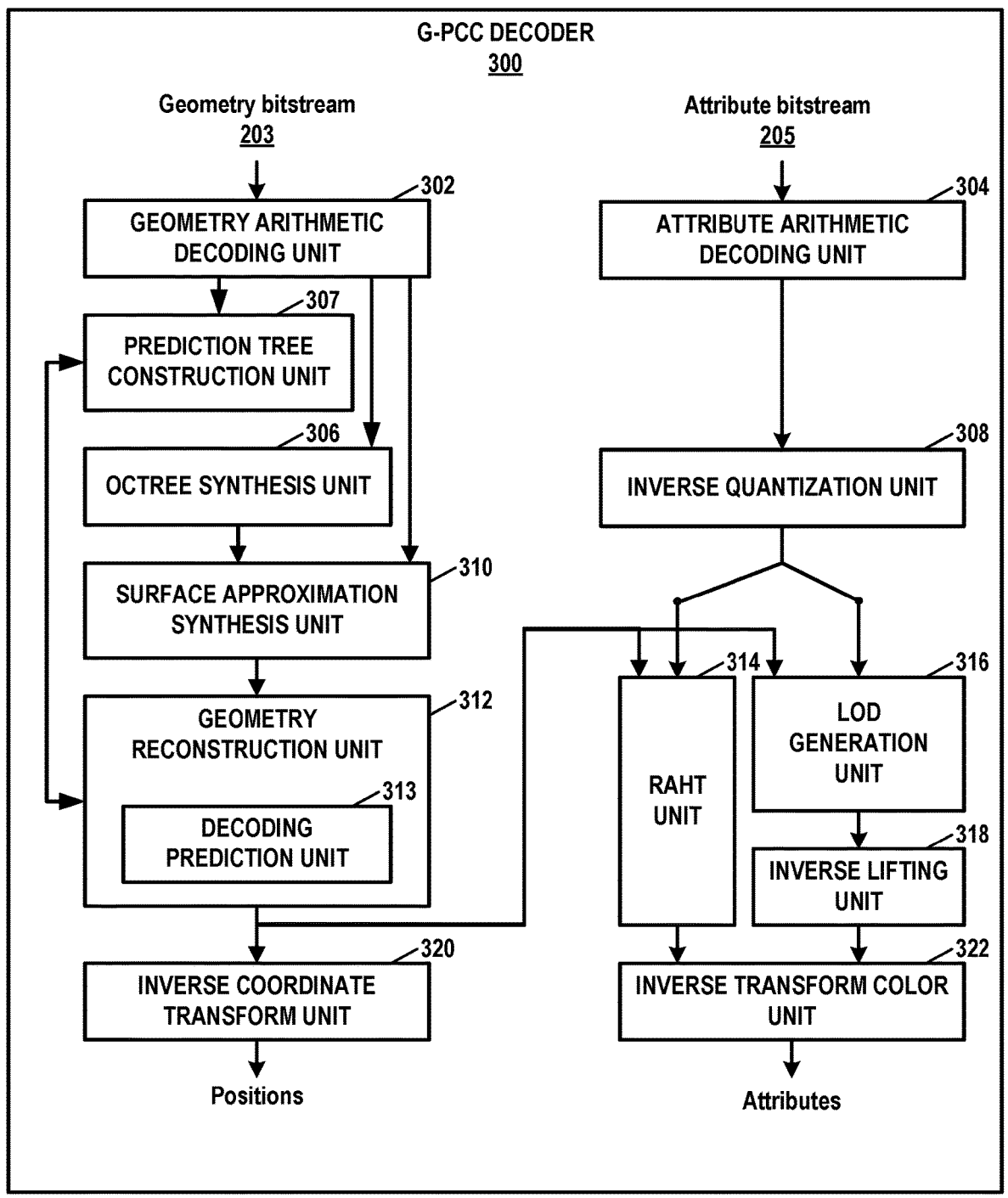
FIG. 3 is a block diagram illustrating an example G-PCC decoder according to techniques of this disclosure.

FIG. 2 provides an overview of G-PCC encoder 200. Specifically, FIG. 2 is a block diagram illustrating an example G-PCC encoder 200 according to techniques of this disclosure. FIG. 3 provides an overview of G-PCC decoder 300. FIG. 3 is a block diagram illustrating an example G-PCC decoder 300 according to techniques of this disclosure. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2, surface approximation analysis unit 212 and RAHT unit 218 are typically used for Category 1 data. LOD generation unit 220 and lifting unit 222 are typically used for Category 3 data. In FIG. 3, surface approximation synthesis unit 310 and RAHT unit 314 are typically used for Category 1 data. LOD generation unit 316 and inverse lifting unit 318 are typically used for Category 3 data. All the other modules are common between Categories 1 and 3.

For geometry, two different types of coding techniques may be used: Octree and predictive-tree coding. In the following, the following focuses on the octree coding. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

Figure 4:
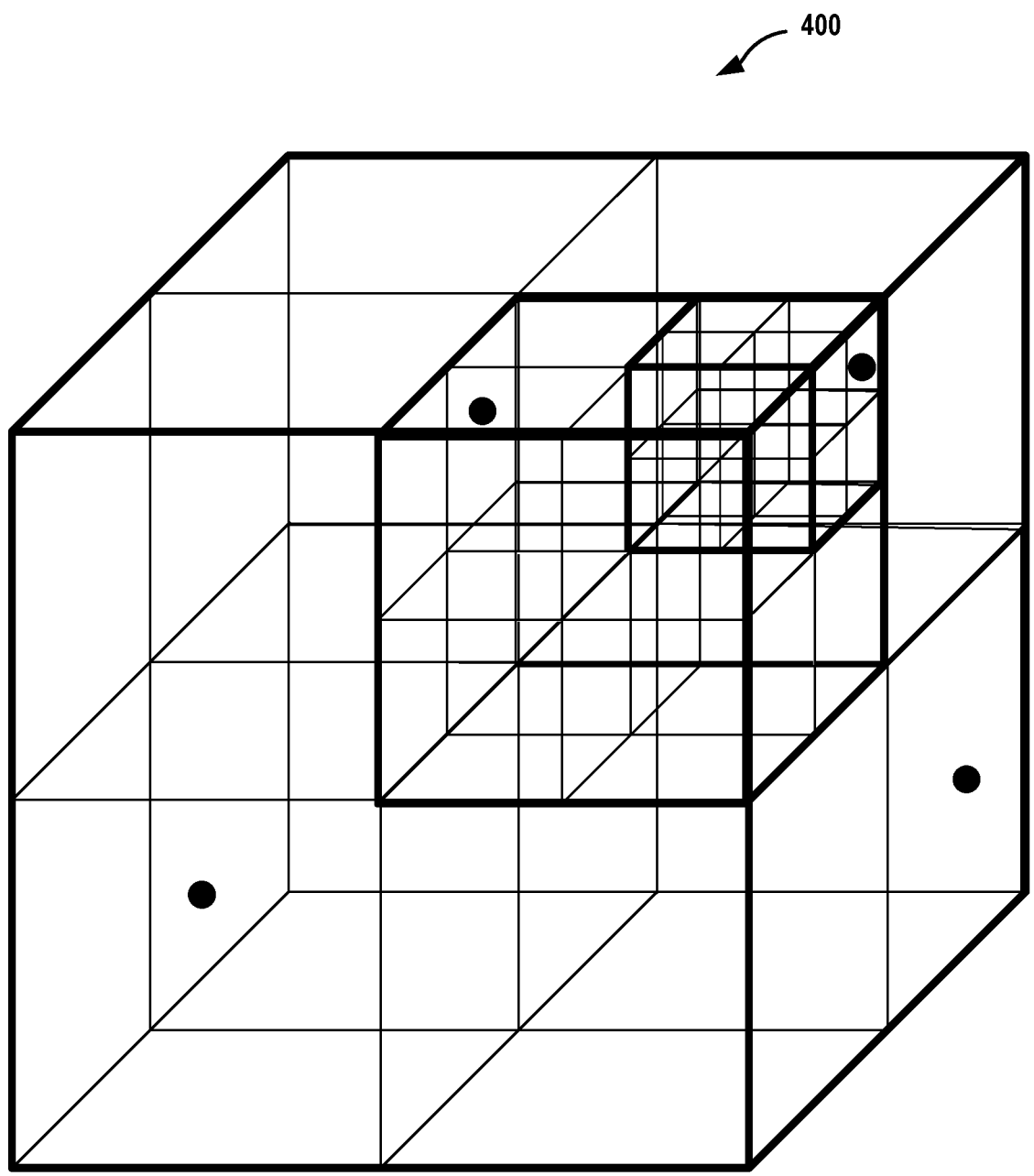
FIG. 4 is a conceptual diagram illustrating an example octree split for geometry coding according to techniques of this disclosure.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded. FIG. 4 is a conceptual diagram illustrating an example octree split for geometry coding.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, a prediction tree construction unit 207, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226. In the example of FIG. 2, octree analysis unit 210 includes an encoding prediction unit 211.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform-to-transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point.

Prediction tree construction unit 207 may be configured to generate a prediction tree based on the voxelized transform coordinates. Prediction tree construction unit 207 may be configured to perform any of the prediction tree coding techniques described above, either in an intra-prediction mode or an inter-prediction mode. In order to perform prediction tree coding using inter-prediction, prediction tree construction unit 207 may access points from previously-encoded frames from geometry reconstruction unit 216. Arithmetic encoding unit 214 may entropy encode syntax elements representing the encoded prediction tree.

Instead of performing prediction tree-based coding, G-PCC encoder 200 may perform octree based encoding. Octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and encoded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., $LOD_1$ is obtained based on refinement level $RL_1$, $LOD_2$ is obtained based on $RL_1$ and $RL_2$, ... $LOD_N$ is obtained by union of $RL_1$, $RL_2$, ... $RL_N$. In some cases, LOD generation may be followed by a prediction scheme (e.g., predicting transform) where attributes associated with each point in the LOD are predicted from a weighted average of preceding points, and the residual is quantized and entropy encoded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, a prediction tree synthesis unit 307, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322. In the example of FIG. 3, geometry reconstruction unit 312 includes a decoding prediction unit 313.

G-PCC decoder 300 may obtain a geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Octree-based coding may be performed either as intra-prediction techniques or inter-prediction techniques. In order to perform octree tree coding using inter-prediction, octree synthesis unit 306 and surface approximation synthesis unit 310 may access points from previously decoded frames from geometry reconstruction unit 312.

Prediction tree synthesis unit may synthesize a prediction tree based on syntax elements parsed from geometry bitstream 203. Prediction tree synthesis unit 307 may be configured to synthesize the prediction tree using any of the techniques described above, including using both intra-prediction techniques or intra-prediction techniques. In order to perform prediction tree coding using inter-prediction, prediction tree synthesis unit 307 may access points from previously decoded frames from geometry reconstruction unit 312.

Geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in the floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Predictive geometry coding was introduced as an alternative to the octree geometry coding. In the example of FIG. 2, encoding prediction unit 211 and/or prediction tree construction unit 207 may implement predictive geometry encoding. In the example of FIG. 3, decoding prediction unit 313 and/or prediction tree construction unit 307 may implement predictive geometry decoding.

Figure 5:
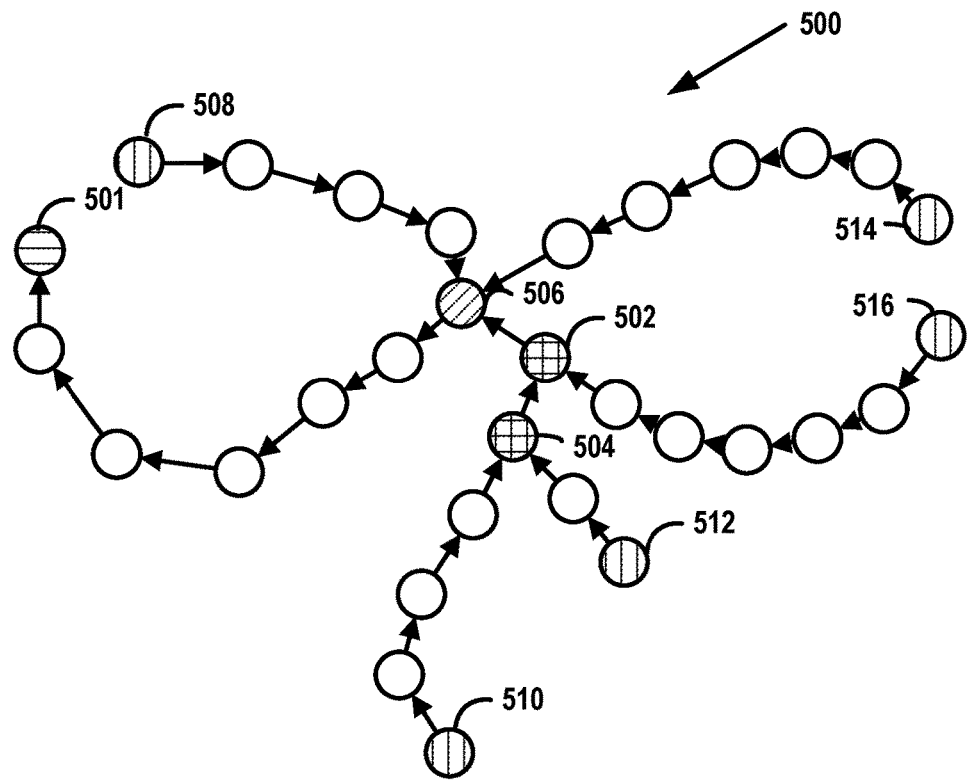
FIG. 5 is a conceptual diagram illustrating an example of a prediction tree according to techniques of this disclosure.

When encoding or decoding points using predictive geometry coding, nodes may be arranged in a tree structure (i.e., a prediction tree) that defines a prediction structure. G-PCC encoder 200 and G-PCC decoder 300 may use various prediction strategies to predict the coordinates of each node in the tree structure with respect to its predictors. FIG. 5 is a conceptual diagram illustrating an example of a prediction tree 500. In the example of FIG. 5, prediction tree 500 is shown as a directed graph where arrows point to the prediction direction. The horizontally lined node 501 is the root node and has no predictors. Double-lined nodes (e.g., nodes 502, 504) have two children; the diagonally lined node (e.g., node 506) has 3 children; the open nodes have one child and the vertically lined nodes (e.g., nodes 508, 510, 512, 514, and 516) are leaf nodes and these have no children. Every node aside from the root node has only one parent node.

Four prediction strategies are specified for each node based on its parent (p0), grand-parent (p1) and great-grand-parent (p2):
  No prediction/zero prediction (0)
  Delta prediction (p0)
  Linear prediction (2*p0−p1)
  Parallelogram prediction (p0+p1−p2)

In the delta prediction strategy, encoding prediction unit 211 of G-PCC encoder 200 may determine a difference (delta) between the position of a current node and the position of the parent node. G-PCC encoder 200 may signal the difference in a bitstream. Decoding prediction unit 313 of G-PCC decoder 300 may use the signaled difference and the position of the parent node to determine the position of the current node. In the linear prediction strategy, encoding prediction unit 211 may determine a predictor position using a linear equation (e.g., 2*p0−p1) that takes a position of a parent node and a position of a grandparent node as parameters. Encoding prediction unit 211 may then determine a difference between the predictor position and the position of the current node. G-PCC encoder 200 may signal the difference in the bitstream. Decoding prediction unit 313 of G-PCC decoder 300 may use the predictor position and the difference to determine the position of the current node. In the parallelogram prediction strategy, encoding prediction unit 211 determines a predictor position using an equation (e.g., 2*p0+p1−p2) that takes a position of a parent node, a position of a grandparent node, and a position of a great-grandparent node as parameters. Encoding prediction unit 211 may then determine a difference between the predictor position and the position of the current node. G-PCC encoder 200 may signal the difference in the bitstream. Decoding prediction unit 313 may use the predictor position and the difference to determine the position of the current node.

G-PCC encoder 200 may employ any algorithm to generate the prediction tree. In some examples, the algorithm may be determined based on the application/use case and several strategies may be used. For each node, the residual coordinate values may be encoded in the bitstream starting from the root node in a depth-first manner. Predictive geometry coding is useful mainly for Category 3 (LIDAR-acquired) point cloud data, e.g., for low-latency applications.

Angular mode may be used in predictive geometry coding, where the characteristics of LIDAR sensors may be utilized in coding the prediction tree more efficiently. The coordinates of the positions are converted to the (r, ϕ, i) (radius, azimuth and laser index) and a prediction is performed in this domain (the residuals are coded in r, ϕ, i domain). Due to the errors in rounding, coding in r, ϕ, i is not lossless and hence a second set of residuals are coded which correspond to the Cartesian coordinates. A description of the encoding and decoding strategies used for angular mode for predictive geometry coding is provided below.

Figure 6A:
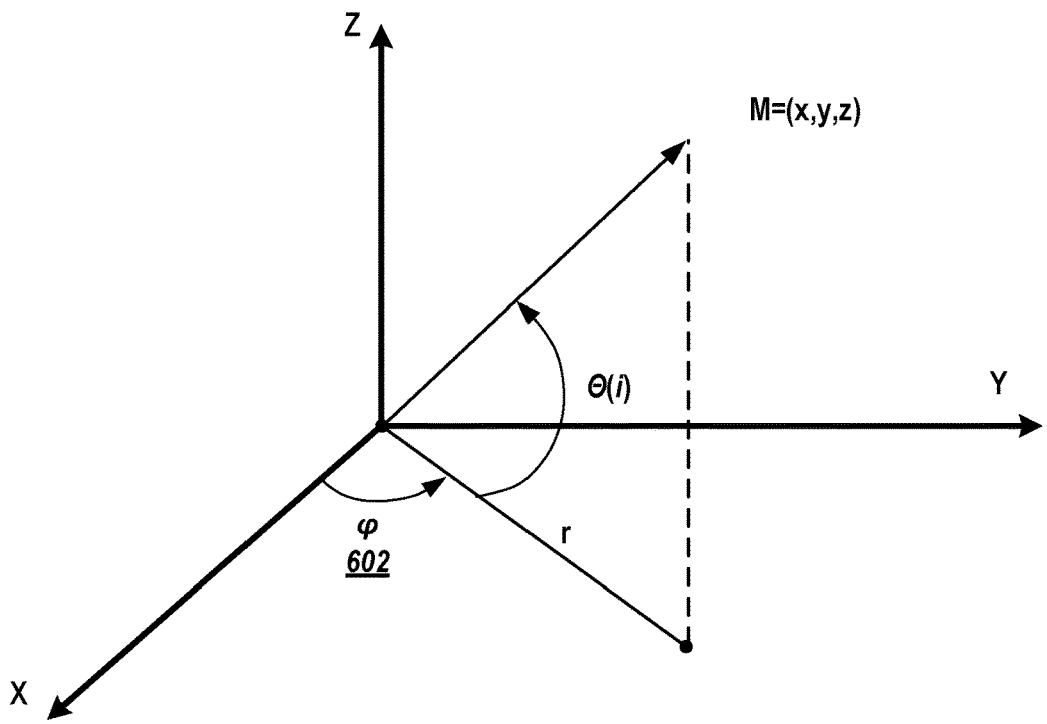
FIG. 6A and FIG. 6B are conceptual diagrams illustrating an example spinning light detection and ranging (LIDAR) acquisition model according to techniques of this disclosure.
Figure 6B:
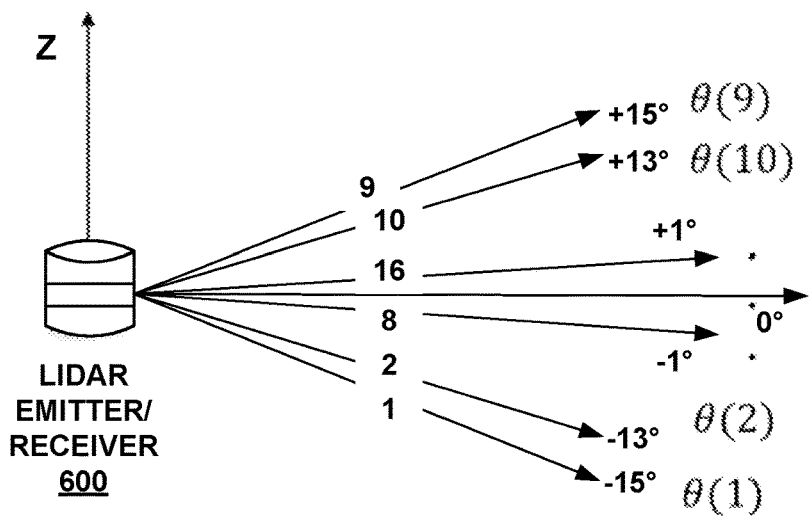

The process focuses on point clouds acquired using a spinning LIDAR model. Here, the LIDAR has N lasers (e.g., N=16, 32, 64) spinning around the Z axis according to an azimuth angle ϕ (see FIG. 6A and FIG. 6B). Each laser may have different elevation $\theta(i)_{i=1...N}$ and height $\zeta(i)_{i=1...N}$. Supposing that the laser i hits a point M, with cartesian integer coordinates (x,y,z), defined according to the coordinate system described in FIG. 6A and FIG. 6B. FIG. 6A and FIG. 6B are conceptual diagrams illustrating an example spinning LIDAR acquisition model.

This process models the position of M with three parameters (r, ϕ, i), which may be computed as follows:

$$r = \sqrt{x^2 + y^2}$$

$$\phi = a\tan2(y, x)$$

$$i = \arg\min_{j=1...N}\{z + \zeta(j) - r \times \tan(\theta(j))\},$$

More precisely, the process may use the quantized version of (r, ϕ, i), denoted (r̃, ϕ̃, i), where the three integers r̃, ϕ̃ and i may be computed as follows:

$$\tilde{r} = \text{floor}\left(\frac{\sqrt{x^2+y^2}}{q_r} + o_r\right) = \text{hypot}(x, y)$$

$$\tilde{\phi} = \text{sign}(a\tan2(y, x)) \times \text{floor}\left(\frac{|a\tan2(y,x)|}{q_\phi} + o_\phi\right)$$

$$i = \arg\min_{j=1...N}\{z + \zeta(j) - r \times \tan(\theta(j))\},$$

where
  $(q_r, o_r)$ and $(q_\phi, o_\phi)$ are quantization parameters controlling the precision of ϕ̃ and r̃, respectively.
  sign(t) is the function that return 1 if t is positive and (−1) otherwise.
  |t| is the absolute value of t.

To avoid reconstruction mismatches due to the use of floating-point operations, the values of $\zeta(i)_{i=1...N}$ and $\tan(\theta(i))_{i=1...N}$ may be pre-computed and quantized as follows:

$$\tilde{z}(i) = \text{sign}(\zeta(i)) \times \text{floor}\left(\frac{|\zeta(i)|}{q_\zeta} + o_\zeta\right)$$

$$\tilde{t}(i) = \text{sign}\left(\zeta(\tan(\theta(j))) \times \text{floor}\left(\frac{|\tan(\theta(j))|}{q_\theta} + o_\theta\right)\right)$$

where
  $(q\zeta, o\zeta)$ and $(q_\theta, o_\theta)$ are quantization parameters controlling the precision of $\tilde{\zeta}$ and $\tilde{\theta}$, respectively.

The reconstructed cartesian coordinates are obtained as follows:

$$\hat{x} = \text{round}(\tilde{r} \times q_r \times \text{app\_cos}(\tilde{\phi} \times q_\phi))$$

$$\hat{y} = \text{round}(\tilde{r} \times q_r \times \text{app\_cos}(\tilde{\phi} \times q_\phi))$$

$$\hat{z} = \text{round}(\tilde{r} \times q_r \times \tilde{t}(i) \times q_\theta - \tilde{z}(i) \times q\zeta),$$

where app_cos(•) and app_sin(•) are approximation of cos(•) and sin(•). The calculations may use a fixed-point representation, a look-up table and linear interpolation.

Note that (x̂,ŷ,ẑ) may be different from (x,y,z) due to various reasons:
  quantization
  approximations
  model imprecision
  model parameters imprecisions $(r_x, r_y, r_z)$ can be the reconstruction residuals defined as follows:

$$r_x = x - \hat{x}$$

$$r_y = y - \hat{y}$$

$$r_z = z - \hat{z}$$

In this process, G-PCC encoder 200 may proceed as follows:
  Encode the model parameters t̃(i) and z̃(i) and the quantization parameters $q_r$, $q\varsigma$, $q_\theta$ and $q_\phi$
  Apply the geometry predictive scheme described in Text of ISO/IEC FDIS 23090-9 Geometry-based Point Cloud Compression, ISO/IEC JTC 1/SC29/WG 7 m55637, Teleconference, October 2020, to the representation (r̃,ϕ̃,i)
  A new predictor leveraging the characteristics of LIDAR could be introduced. For instance, the rotation speed of the LIDAR scanner around the z-axis is usually constant. Therefore, we could predict the current ϕ̃(j) as follows:

$$\tilde{\phi}(j)=\tilde{\phi}(j-1)+n(j)\times\delta_\phi(k)$$

Where
  $(\delta_\phi(k))_{k=1\ldots K}$ is a set of potential speeds from which the encoder could determine. The index k may be explicitly written to the bitstream or may be inferred from the context based on a deterministic strategy applied by both the encoder and the decoder, and
  n(j) is the number of skipped points which may be explicitly written to the bitstream or may be inferred from the context based on a deterministic strategy applied by both G-PCC encoder 200 and G-PCC decoder 300. n(j) is also referred to as "phi multiplier" later. Note, n(j) is currently used only with delta predictor.
  Encode with each node the reconstruction residuals ($r_x$, $r_y$, $r_z$)
G-PCC decoder 300 may proceed as follows:
  Decode the model parameters t̃(i) and z̃(i) and the quantization parameters $q_r$, $q\varsigma$, $q_\theta$ and $q_\phi$
  Decode the (r̃,ϕ̃,i) parameters associated with the nodes according to a geometry predictive scheme.
  Compute the reconstructed coordinates (x̂,ŷ,ẑ) as described above.
  Decode the residuals ($r_x$,$r_y$,$r_z$)
    As discussed in the next section, lossy compression may be supported by quantizing the reconstruction residuals ($r_x$,$r_y$,$r_z$)
  Compute the original coordinates (x,y,z) as follows:

$$x = r_x + \hat{x}$$
  $$y = r_y + \hat{y}$$
  $$z = r_z + \hat{z}$$

Lossy compression may be achieved by applying quantization to the reconstruction residuals ($r_x$,$r_y$,$r_z$) or by dropping points.

The quantized reconstruction residuals may be computed as follows:

$$\tilde{r}_x = \text{sign}(r_x) \times \text{floor}\left(\frac{|r_x|}{q_x} + o_x\right)$$

$$\tilde{r}_y = \text{sign}(r_y) \times \text{floor}\left(\frac{|r_y|}{q_y} + o_y\right)$$

$$\tilde{r}_z = \text{sign}(r_z) \times \text{floor}\left(\frac{|r_z|}{q_z} + o_z\right)$$

Where ($q_x$,$o_x$), ($q_y$,$o_y$) and ($q_z$,$o_z$) are quantization parameters controlling the precision of $\tilde{r}_x$, $\tilde{r}_y$ and $\tilde{r}_z$, respectively.

Trellis quantization may be used to further improve the RD (rate-distortion) performance results. The quantization parameters may change at a sequence/frame/slice/block level to achieve region adaptive quality and for rate control purposes.

Predictive geometry coding may use a prediction tree structure to predict the positions of the points. When angular coding is enabled, the x, y, z coordinates are transformed to radius, azimuth and laserID, and residuals are signaled in these three coordinates as well as in the x, y, z dimensions. The intra prediction used for radius, azimuth and laserID may be one of four modes and the predictors are the nodes that are classified as parent, grandparent and great-grandparent in the prediction tree with respect to the current node. The predictive geometry coding is an intra coding tool as it only uses points in the same frame for prediction. Additionally, using points from previously decoded frames may provide a better prediction and thus better compression performance.

Inter prediction, as initially proposed, predicted the radius of a point from a reference frame. For each point in a prediction tree, such as prediction tree 500 (FIG. 5), G-PCC encoder 200 or G-PCC decoder 300 determines whether the point is inter predicted or intra predicted. G-PCC encoder 200 may use a flag to indicate whether the point is inter predicted or intra predicted. When a point is intra predicted, G-PCC encoder 200 and G-PCC decoder 300 may use the intra prediction modes of predictive geometry coding. When inter prediction is used, the azimuth and laserID are still predicted with intra prediction, while the radius is predicted from the point in the reference frame that has the same laserID as the current point and an azimuth that is closest to the current azimuth. A further development of this process may enable inter prediction of the azimuth and laserID in addition to radius prediction. When inter prediction is applied, G-PCC encoder 200 and G-PCC decoder 300 may predict the radius, azimuth and laserID of the current point based on a point that is near the azimuth position of a previously decoded point in the reference frame. In addition, G-PCC encoder 200 and G-PCC decoder 300 may use separate sets of contexts for inter prediction and intra prediction.

Figure 7:
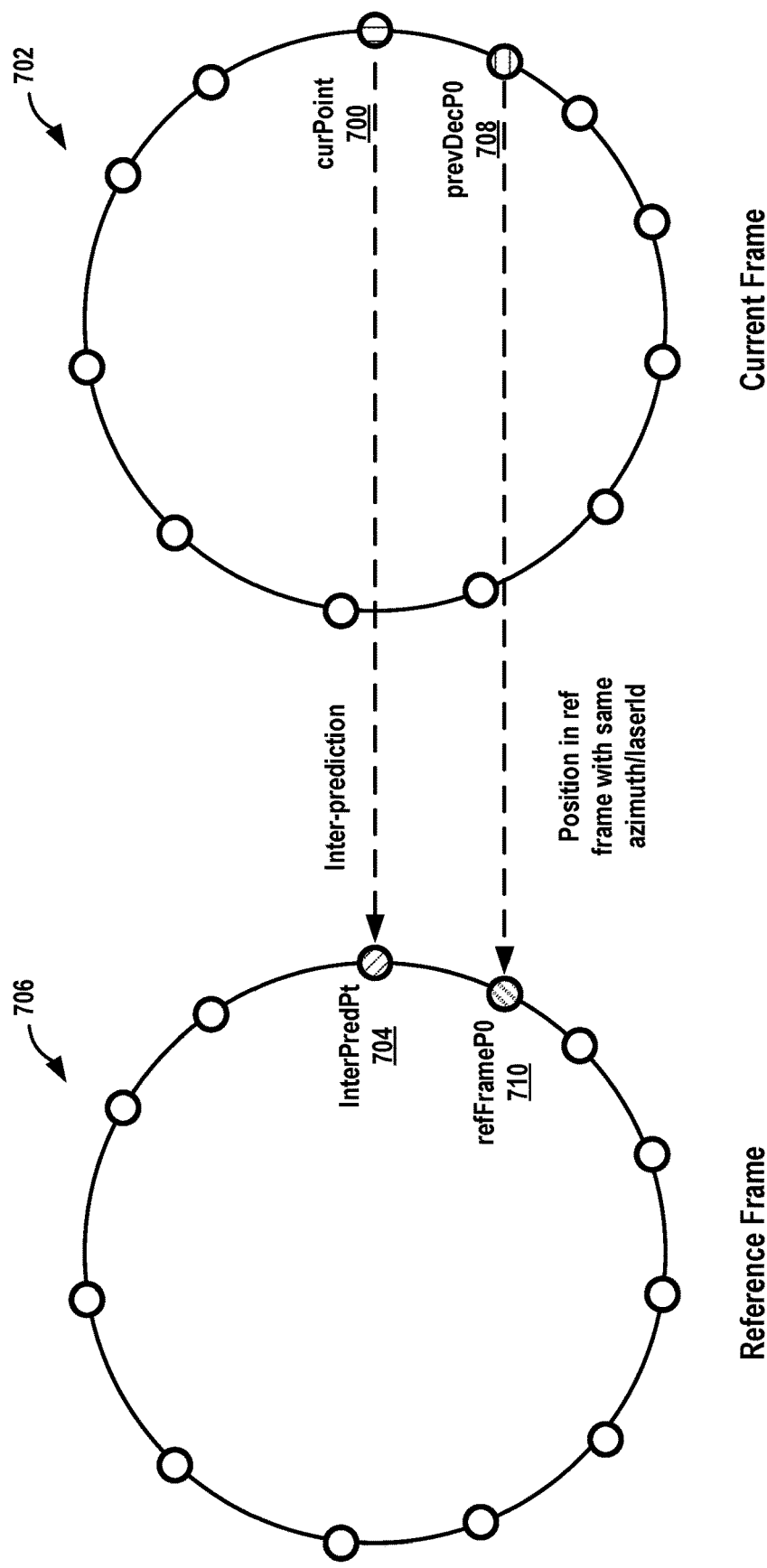
FIG. 7 is a conceptual diagram illustrating an example of inter prediction of a current point from an inter predictor in a reference frame according to techniques of this disclosure.

A process for inter prediction is illustrated in FIG. 7. FIG. 7 is a conceptual diagram illustrating an example of inter prediction of a current point 700 (curPoint) in a current frame 702 from an inter prediction point 704 (interPredPt) (i.e., an inter predictor) in a reference frame 706. Each small circle corresponds to a point or other position. In the example of FIG. 7, the extension of inter prediction to azimuth, radius, and laserID may include or consist of the following steps:
  For a given point, determine the previous decoded point (prevDecP0).
  Determine a position in reference frame (refFrameP0) that has the same scaled azimuth and laserID as prevDecP0.
  In reference point cloud frame, find the first point (interPredPt) that has azimuth (e.g., scaled azimuth) greater than that of refFrameP0. The interPredPt is also referred to as the "Next" inter predictor.

Thus, in the example of FIG. 7, G-PCC encoder 200 and G-PCC decoder 300 may identify a previous point 708 (prevDecP0) in current frame 702. Previous point 708 was encoded or decoded previous to current point 700 of current frame 702.

Additionally, G-PCC encoder 200 and G-PCC decoder 300 may identify a reference position 710 (refFrameP0). Reference position 710 is a position in reference frame 706 and has a laser identifier (laserID) and a scaled azimuth matching a laser identifier and an azimuth of previous point 708 in current frame 702. G-PCC encoder 200 and G-PCC decoder may identify inter prediction point 704. Inter prediction point 704 may be a next point in reference frame 706 having a scaled azimuth greater than the scaled azimuth of reference position 710. Inter prediction point 704 may be a predictor of the radius, azimuth, and laserID of current point 700. G-PCC encoder 200 may encode current point 700 based on the predictor for current point 700. For instance, as part of encoding current point 700, G-PCC encoder 200 may signal a difference between a position of inter prediction point 704 and a position of current point 700. As part of decoding current point 700, G-PCC decoder 300 may add the signaled difference to the position of inter prediction point 704 to determine the position of current point 700.

Figure 8:
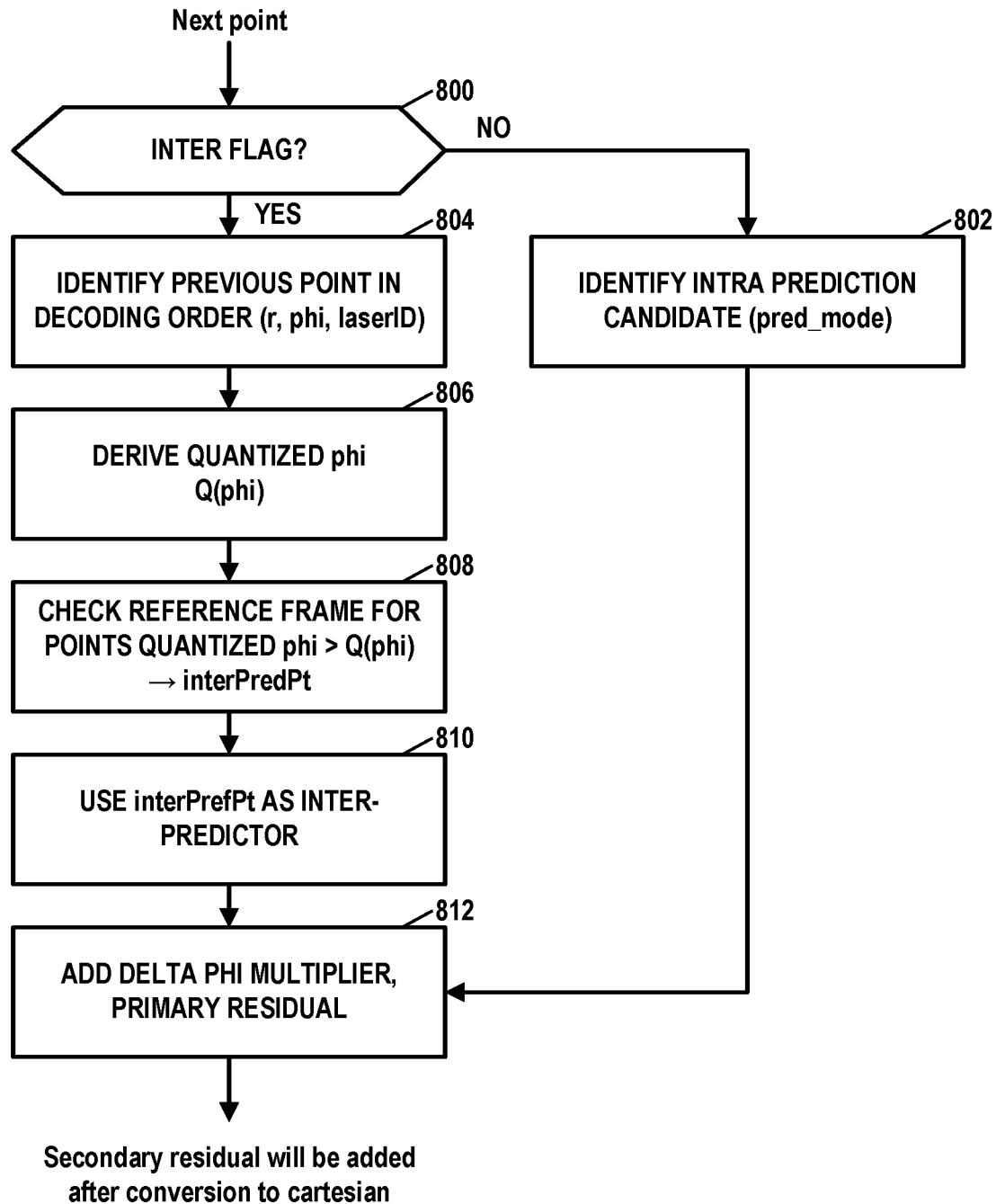
FIG. 8 is a flowchart illustrating an example decoding flow associated with the "inter_flag" that is signaled for every point according to techniques of this disclosure.

FIG. 8 is a flowchart illustrating an example decoding flow associated with the "inter flag" that is signaled for every point. The inter flag signaled for a point indicates whether inter prediction is applied for the point. The flowcharts of this disclosure are provided as examples. Other examples may include more, fewer, or different steps, or steps may be performed in different orders.

In the example of FIG. 8, G-PCC decoder 300 may determine whether an inter flag of a next point to be decoded (i.e., a current point of a current frame of point cloud data) indicates that the current point is inter predicted (800). If the inter flag of the current point does not indicate that the current point is inter predicted ("NO" branch of 800), G-PCC decoder 300 may identify an intra prediction candidate (802). For instance, G-PCC decoder 300 may determine an intra prediction strategy (e.g., no prediction, delta prediction, linear prediction, parallelogram prediction, etc.) to determine a predictor for the current point. A syntax element (pred_mode) signaled in geometry bitstream 203 may indicate the intra prediction strategy to use to determine the predictor for the current point.

On the other hand, if the inter flag for the current point indicates that the current point is inter predicted ("YES" branch of 800), G-PCC decoder 300 may identify a previous point in decoding order (e.g., previous point 708) (804). The previous point may have coordinates (r, phi, and laserID). G-PCC decoder 300 may then derive a quantized phi coordinate (i.e., azimuth coordinate) of the previous point (806). The quantized phi coordinate may be denoted as Q(phi). G-PCC decoder 300 may then check a reference frame (e.g., reference frame 706) for points (i.e., inter prediction points (e.g., interPredPt 704)) having quantized phi coordinates greater than the quantized phi coordinate of the previous point (808). G-PCC decoder 300 may use the inter prediction point as a predictor for the current point (810).

Regardless of whether G-PCC decoder 300 determines the predictor for the current point using intra prediction (e.g., as described with respect to step 802) or using inter prediction (e.g., as described with respect to steps 804-810), G-PCC decoder 300 may add a delta phi multiplier.

The LIDAR system may scan and sample the content at a particular azimuth frequency. G-PCC encoder 200 may signal the azimuth of a point using a azimuth residual value (resAz2). Theazimuth residual is not the direct difference of the azimuth of the current point and the azimuth of the predictor for the current point (which may be determined using inter or intra prediction). Rather, G-PCC encoder 200 encodes the azimuth residual as a combination of a delta phi multiplier and a residual. For example, azimSpeed may represent the azimuth difference between successive captures of one of the rotating LIDAR sensors (note there are multiple sensors in each spinning LIDAR system). Thus, if each LIDAR sensor in the spinning LIDAR system captures 1000 points per rotation, then the azimSpeed would be (1<<azimBitDepth)/1000, effectively the azimuth difference between adjacent point captures. Here, azimBitDepth is a bitdepth used to represent the azimuth value at G-PCC encoder 200. (1<<azimBitDepth) represents one full rotation (of 360 degrees). Therefore, (1<<azimBitDepth)/1000 represents the difference between azimuth of two captures. Although LIDAR sensors may be designed to sample at constant intervals in a rotation, the difference between azimuth values of adjacent captures may not be azimSpeed, or a multiple of azimSpeed due to noise and other inaccuracies. A first azimuth residual resAz1, which is the difference in the azimuth of the current point and the predictor, is coded as a combination of delta phi multiplier (qphi) and a second azimuth residual (resAz2). qphi may be derived as follows:

qphi=deltaPhi>=0?(deltaPhi+(_geomAngularAzi-
   muthSpeed>>1))/_geomAngularAzimuthSpeed:–
   (–deltaPhi+(_geomAngularAzimuth-
   Speed>>1))/_ geomAngularAzimuthSpeed;

The value of coded azimuth residual, resAz2, is obtained as resAz1–deltaPhi*azimSpeed. Both qphi and resAz2 are signalled in the bitstream. G-PCC decoder 300 may decode resAz2 and qphi. G-PCC decoder 300 may obtain the reconstructed azimuth residual (resAz1) as resAz2+qphi*azimSpeed.

Figure 9:
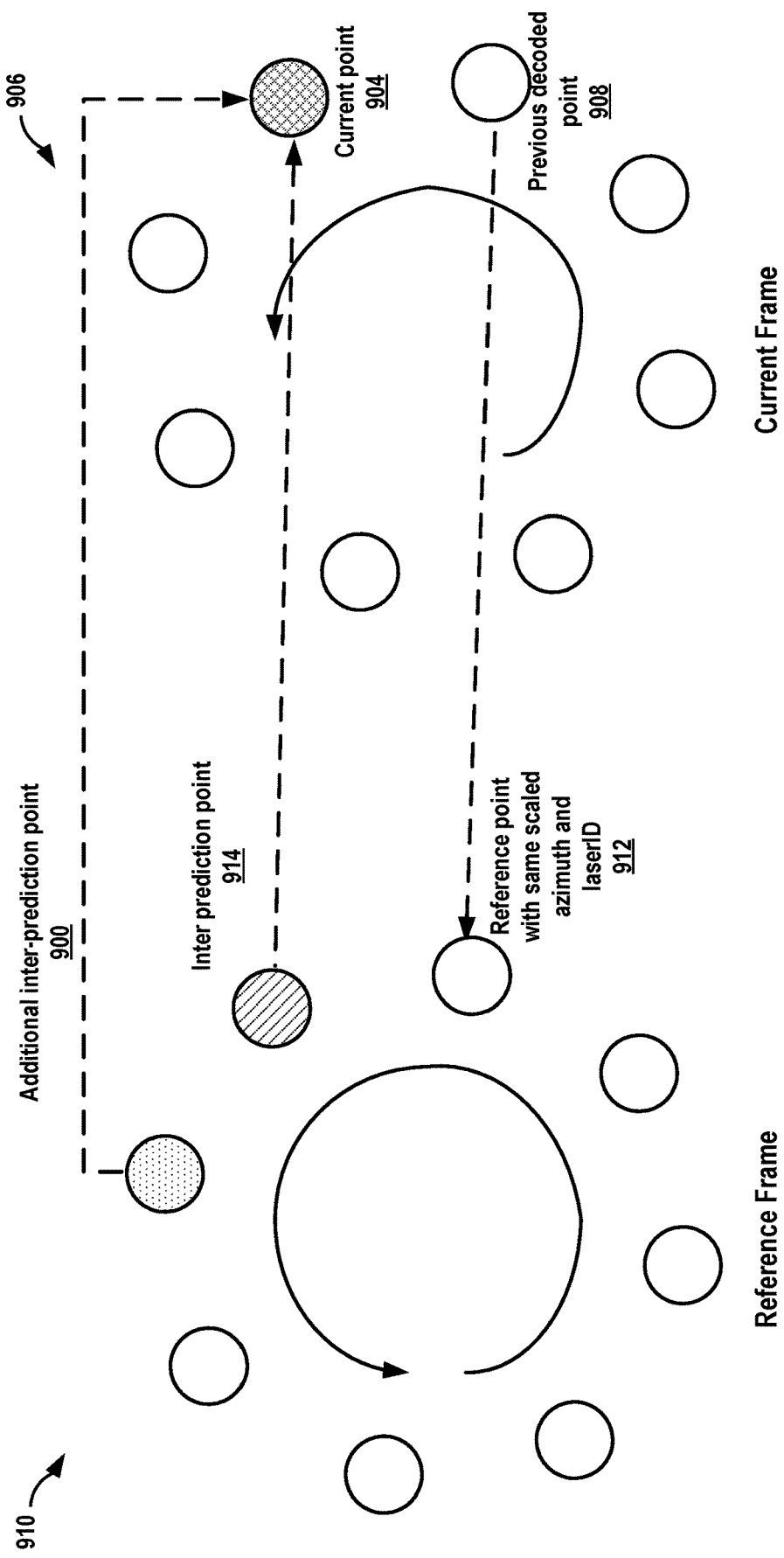
FIG. 9 is a conceptual diagram illustrating an example additional inter predictor point obtained from the first point that has azimuth greater than the inter predictor point according to techniques of this disclosure.

FIG. 9 is a conceptual diagram illustrating an example additional inter predictor point 900 obtained from the first point that has azimuth greater than an inter predictor point 914. In the inter prediction method for predictive geometry described above with respect to FIG. 7, the radius, azimuth and laserID of a current point (current point 700) are predicted based on a point (inter prediction point 704) that is near the collocated azimuth position (reference position 710) in a reference frame (reference frame 706) when inter coding is applied. In the example of FIG. 9, G-PCC encoder 200 and G-PCC decoder 300 may determine additional inter predictor point 900 using the following steps:

a) for a given point (current point 904 of a current frame 906), determine a previous point 908 in current frame 906 ("prev decoded point" in FIG. 9);
b) determine a reference position 912 in a reference frame 910 that has the same scaled azimuth and laserID as the previous point 908 determined in step a) ("ref point with same scaled azimuth and laserID" in FIG. 9),
c) determine a position in reference frame 910 as the first point that has an azimuth (e.g., scaled azimuth) greater than the reference position 912 determined in step b), to be used as the inter predictor point (inter prediction point 914 in FIG. 9).

An additional inter predictor point may be obtained by finding the first point that has an azimuth (e.g., scaled azimuth) greater than inter prediction point 914 determined in step c) as shown in FIG. 9 ("additional inter prediction point 900" in FIG. 9). Additional signaling may be used to indicate which of the predictors is selected if inter coding has been applied. The additional inter predictor point may also be referred to as the "NextNext" inter predictor.

In some examples, G-PCC encoder 200 (e.g., arithmetic encoding unit 214 of G-PCC encoder 200) and G-PCC decoder 300 (e.g., geometry arithmetic decoding unit 302 of G-PCC decoder 300) may apply an improved context selection algorithm for coding the inter prediction flag. The inter prediction flag values of the five previously coded points may be used to select the context of the inter prediction flag in predictive geometry coding.

Inter prediction coding for predictive geometry coding may use a zero-compensated reference frame. The tools described above are used to code the points with inter prediction. However, when motion compensated frames are used for reference, the tools described above may not be optimal in coding the content. The motion compensation process may warp the points resulting in a misalignment between the current and reference frames, and this misalignment is not efficiently coded with tools described above.

This disclosure describes techniques that may address this problem, potentially resulting in improved efficiency. The techniques disclosed in this document may be applied independently or in a combined way. Although the discussion is predominantly on the polar coordinate system, techniques disclosed in this application may also apply to other coordinate systems such as Cartesian, spherical, or any custom coordinate system that may be used to represent/code the point cloud positions and attributes. G-PCC utilizes the radius and azimuthal angle from the spherical coordinate system in combination with a laser identifier (cfr., elevation angle) from the LIDAR sensor that captured the point.

In accordance with a technique of this disclosure, a mixed inter/intra prediction mode may be defined where a point is coded/predicted with the help of one or more intra predictor points and one or more inter predictor points. For example, one or more dimensions may be predicted using intra prediction, and the other dimension(s) may be predicted using inter prediction. For a current point position, the radius predictor may be obtained by inter prediction, whereas the azimuth and laser ID may be obtained using intra prediction. When two or more dimensions of a point are predicted using inter (or intra) prediction, one dimension may be predicted by one inter (or intra) prediction mode and another dimension may be predicted by another inter (or intra) prediction mode. For example, the radius may be predicted with inter prediction, and azimuth/laser ID predicted with intra prediction. Herein, the azimuth may be predicted with a particular mode (linear prediction) and laser ID predicted with a different mode (delta prediction). For example, if radius and azimuth are predicted using inter prediction, radius may be predicted using the Next inter predictor, and the azimuth may be predicted using the NextNext inter predictor.

Thus, in some examples, G-PCC encoder 200 or G-PCC decoder 300 may generate a prediction for a point of the point cloud data based on one or more intra predictor points and one or more inter predictor points. G-PCC encoder 200 may encode the point based on the prediction for the point. G-PCC decoder 300 may decode the point based on the prediction for the point.

FIG. 10 is a flowchart illustrating an example operation of G-PCC encoder 200 that uses mixed intra/inter prediction, according to techniques of this disclosure. In the example of FIG. 10, encoding prediction unit 211 may generate a predictor for a current point of a current frame of point cloud data based on one or more intra predictor points and one or more inter predictor points (1000). For example, encoding prediction unit 211 may determine an intra predictor point for the current point, e.g., using a prediction tree as described with regard to FIG. 5. In this example, encoding prediction unit 211 may determine an inter predictor point, e.g., using inter prediction as described with regard to FIGS. 7-9. Encoding prediction unit 211 may generate the predictor for the current point such that a first coordinate value of the predictor for the current point is equal to a corresponding first coordinate value of the intra predictor point and a second coordinate value of the predictor for the current point is equal to a corresponding second coordinate value of the inter predictor point. For instance, the radius coordinate value of the predictor for the current point may be equal to the radius coordinate value of the intra predictor point and the azimuth coordinate value of the predictor for the current point may be equal to the azimuth coordinate value of the inter predictor point. Thus, in some examples, encoding prediction unit 211 may determine at least a first dimension of the predictor using intra prediction and determine at least a second dimension of the predictor using inter prediction. In some examples, the first and second dimensions are different ones of a radius, an azimuth, and a laser identifier.

G-PCC encoder 200 may encode the current point based on the predictor for the current point (1002). For example, encoding prediction unit 211 may determine residual data indicating differences between coordinate values of a position of the current point and corresponding coordinate values of the predictor for the current point. In some examples, such as examples where encoding prediction unit 211 uses residual prediction, encoding prediction unit 211 may determine residual data based on the position of the current point, the predictor for the current point, and a residual predictor. Arithmetic encoding unit 214 may apply arithmetic encoding to syntax elements indicating the residual data.

FIG. 11 is a flowchart illustrating an example operation of G-PCC decoder 300 that uses mixed intra/inter prediction, according to techniques of this disclosure. In the example of FIG. 11, decoding prediction unit 313 may generate a predictor for a current point of a current frame of point cloud data based on one or more intra predictor points and one or more inter predictor points (1100). Decoding prediction unit 313 may generate the predictor for the current point in the same way as encoding prediction unit 211.

G-PCC decoder 300 may decode the current point based on the predictor for the current point (1102). For example, G-PCC decoder 300 may obtain residual data from a bitstream (e.g., geometry bitstream 203). Arithmetic encoding unit 214 may apply arithmetic encoding to syntax elements indicating the residual data. In some examples, the residual data may indicate differences between coordinate values of a position of the current point and corresponding coordinate values of the predictor for the current point. In such examples, decoding prediction unit 313 may, as part of decoding the current point, determine a position of the current point by adding corresponding coordinate values of the predictor for the current point and residual data. In some examples where decoding prediction unit 313 uses residual prediction, G-PCC decoder 300 may, as part of decoding the current point, determine a position of the current point by adding corresponding coordinate values of the residual data, the predictor for the current point, and a residual predictor. Thus, in some examples, decoding prediction unit 313 may determine at least a first dimension of the predictor using intra prediction and determine at least a second dimension of the predictor using inter prediction. In some examples, the first and second dimensions are different ones of a radius, an azimuth, and a laser identifier. In other examples where decoding prediction unit 313 uses residual prediction, G-PCC decoder 300 may generate the predictor for the current point using inter prediction based only on zero-compensated reference frame, or based only on a global motion compensated reference frame.

In accordance with a technique of this disclosure, G-PCC encoder 200 and G-PCC decoder 300 may obtain a mixed reference picture (frame) from one or more reference frames. For a point in the reference frame, a point may be added in the mixed reference frame such that, for each dimension of a point coordinate system, G-PCC encoder 200 or G-PCC decoder 300 determines a reference picture from which the predictor will be chosen. For example, if radius, azimuth and laser ID are the three dimensions, then the corresponding reference picture $refPic_R$, $refPic_A$, $refPic_L$ are chosen. The reference picture of two or more coordinates may be the same. For example, $refPic_R$ and $refPic_L$ may refer to the same picture and $refPic_A$ may refer to another picture; in another example, all $refPic_R$, $refPic_A$, $refPic_L$ may refer to the same picture; in a further example, all $refPic_R$, $refPic_A$, $refPic_L$ may refer to separate pictures. For example, $refPic_R$ and $refPic_L$ may refer to a motion compensated reference frame, whereas $refPic_A$ may refer to a zero compensated reference frame. The coordinate system used may be radius, azimuth, laser ID, or other coordinate system such as (x, y, z) or (r, phi, theta).

Thus, in some examples, G-PCC encoder 200 or G-PCC decoder 300 may obtain a mixed reference frame based on one or more reference frames; add a point in the mixed reference frame for a point in a reference frame of the one or more reference frames; perform inter prediction using the added point to generate a prediction for a point of the point cloud data; and encode or decode the point based on the prediction for the point.

Figure 12:
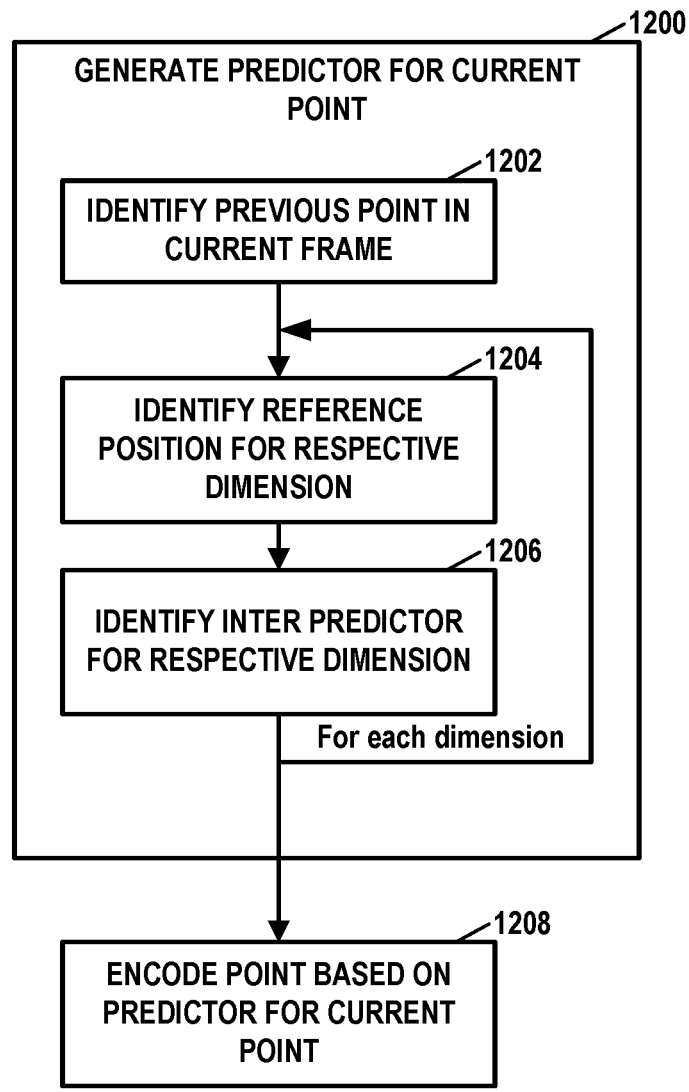
FIG. 12 is a flowchart illustrating an example operation of a G-PCC encoder that uses mixed reference frame for inter prediction according to techniques of this disclosure.

FIG. 12 is a flowchart illustrating an example operation of G-PCC encoder 200 that uses mixed reference frame for inter prediction, according to techniques of this disclosure. In the example of FIG. 12, encoding prediction unit 211 of G-PCC encoder 200 may generate a predictor for a current point of a current frame of the point cloud data (1200). As part of generating the predictor for the current point, encoding prediction unit 211 may identify a previous point in the current frame (1202). The previous point was encoded previous to a current point of the current frame. In some examples, the previous point is a point most recently encoded by G-PCC encoder 200 prior to the current point. In other examples, the previous point may be another point of the current frame encoded previous to the current point.

For each respective dimension of a plurality of dimensions of a point coordinate system, encoding prediction unit 211 may identify a reference position for the respective dimension (1204). The dimensions may include all of the dimensions used to represent positions of points in the point cloud data, or a subset of the dimensions used to represent positions of points in the point cloud data. The reference position for the respective dimension is a position in a reference frame for the respective dimension and has a laser identifier and a scaled azimuth matching a laser identifier and an azimuth of the previous point in the current frame. In some examples, the dimensions include two or more of a radius dimension, an azimuth dimension, or a laser identifier dimension. In some examples, the dimensions include two or more of an x dimension, a y dimension, or a z dimension. In some examples, the dimensions include two or more of an r dimension, a phi dimension, or a theta dimension. For inter prediction reference point indexing and search, an azimuth scale value is signaled in the bitstream. The scaled azimuth value may be obtained by dividing the azimuth value with the azimuth scale value.

In accordance with a technique of this disclosure, the reference frame for the respective dimension and a reference frame for at least one other dimension in the plurality of dimensions are different reference frames in a plurality of reference frames. For example, the plurality of reference frames may include a zero-compensated reference frame and a global motion compensated reference frame. In this example, the reference frame for one of the dimensions may be the zero-compensated reference frame and the reference frame for another one of the dimensions may be the global motion compensated reference frame.

Encoding prediction unit 211 may identify an inter predictor for the respective dimension (1206). The inter predictor for the respective dimension is a point in the reference frame for the respective dimension having an azimuth greater than the scaled azimuth of the reference position for the respective dimension. In some examples, the inter prediction point is a next point in the reference frame for the respective dimension having an azimuth greater than the azimuth of the reference position (i.e., the inter prediction point is a Next inter prediction point). In some examples, the inter predictor is a point in the reference frame for the respective dimension having an azimuth greater than the next point in the reference frame for the respective dimension that has an azimuth greater than the reference position for the respective dimension (i.e., the inter prediction point is a NextNext inter prediction point). Thus, in some examples, encoding prediction unit 211 may determine the inter predictor for the respective dimension as a first next point (Next). The first next point is a point in the reference frame for the respective dimension having an azimuth greater than the scaled azimuth of the reference position for the respective dimension. In some examples, encoding prediction unit 211 may determine the inter predictor for the respective dimension as a second next point. The second next point is a point in the reference frame for the respective dimension having an azimuth greater than the azimuth of the first next point. In some examples, G-PCC encoder 200 may signal a mode indication that indicates an inter prediction mode for the current point. The inter predictor for the respective dimension may be the first next point or the second next point depending on the inter prediction mode for the current point. In these examples, scaled azimuth may be used in place of azimuth.

The predictor for the current point has a coordinate value in the respective dimension corresponding to a coordinate value in the respective dimension of the inter prediction point for the respective dimension. For example, if the respective dimension is the azimuth dimension, the azimuth coordinate value of the predictor for the current point may be equal to the azimuth coordinate value of the inter prediction point for the azimuth dimension.

Encoding prediction unit 211 may encode the current point based on the predictor for the current point (1208). For example, encoding prediction unit 211 may generate residual data for the current point based on the predictor for the current point. In this example, encoding prediction unit 211 may generate the residual data by subtracting each coordinate value of the position of the current point from a corresponding coordinate value of the predictor. G-PCC encoder 200 may signal the residual data in a geometry bitstream (e.g., geometry bitstream 203). In some examples, arithmetic encoding unit 214 applies arithmetic encoding to syntax elements that indicate the residual data.

Figure 13:
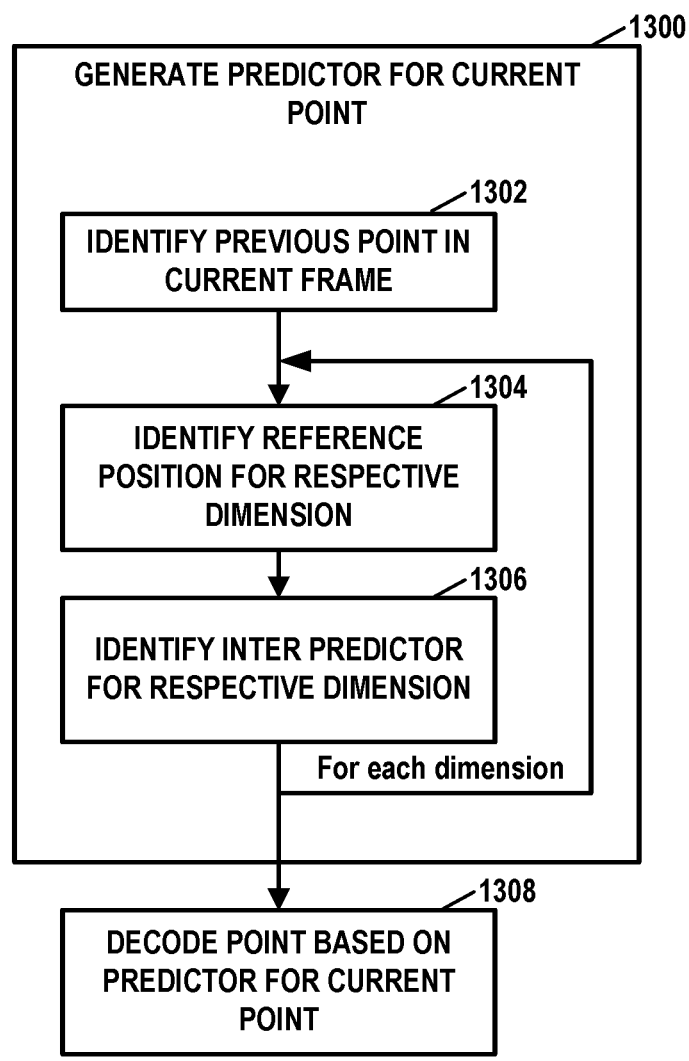
FIG. 13 is a flowchart illustrating an example operation of a G-PCC decoder that uses mixed reference frame for inter prediction according to techniques of this disclosure.

FIG. 13 is a flowchart illustrating an example operation of G-PCC decoder 300 that uses mixed reference frame for inter prediction, according to techniques of this disclosure. In the example of FIG. 13, decoding prediction unit 313 of G-PCC decoder 300 may generate a predictor for a current point of a current frame of point cloud data (1300). As part of generating the predictor for the current point, decoding prediction unit 313 may identify a previous point in a current frame of point cloud data (1302). The previous point was decoded previous to a current point of the current frame. In some examples, the previous point is a point most recently decoded by G-PCC decoder 300 prior to the current point. In other examples, the previous point may be other points of the current frame decoded previous to the current point.

For each respective dimension of a plurality of dimensions of a point coordinate system, decoding prediction unit 313 may identify a reference position for the respective dimension (1304). The dimensions may include all of the dimensions used to represent positions of points in the point cloud data, or a subset of the dimensions used to represent positions of points in the point cloud data. The reference position for the respective dimension is a position in a reference frame for the respective dimension and has a laser identifier and a scaled azimuth matching a laser identifier and an azimuth of the previous point in the current frame. The reference frame for the respective dimension and a reference frame for at least one other dimension in the plurality of dimensions are different reference frames in a plurality of reference frames. In some examples, the plurality of reference frames includes a zero-compensated reference frame and a global motion compensated reference frame. In some examples, the dimensions include two or more of a radius dimension, an azimuth dimension, or a laser identifier dimension. In some examples, the dimensions include two or more of an x dimension, a y dimension, or a z dimension. In some examples, the dimensions include two or more of an r dimension, a phi dimension, or a theta dimension.

Decoding prediction unit 313 may identify an inter predictor for the respective dimension (1306). The inter prediction point for the respective dimension may be a point in the reference frame for the respective dimension having a scaled azimuth greater than the scaled azimuth of the reference position for the respective dimension. In some examples, the inter prediction point is a next point in the reference frame for the respective dimension having a scaled azimuth greater than the scaled azimuth of the reference position (i.e., the inter prediction point is a Next inter prediction point). In some examples, the inter prediction point is a point in the reference frame for the respective dimension having a scaled azimuth greater than the next point in the reference frame for the respective that has a scaled azimuth greater than the reference position for the respective dimension (i.e., the inter prediction point is a NextNext inter prediction point). A predictor for the current point has a coordinate value in the respective dimension corresponding to a coordinate value in the respective dimension of the inter prediction point for the respective dimension.

Thus, in some examples, encoding prediction unit 211 may determine the inter predictor for the respective dimension as a first next point (Next). The first next point is a point in the reference frame for the respective dimension having a scaled azimuth greater than the scaled azimuth of the reference position for the respective dimension. In some examples, encoding prediction unit 211 may determine the inter predictor for the respective dimension as a second next point. The second next point is a point in the reference frame for the respective dimension having a scaled azimuth greater than the scaled azimuth of the first next point. In some examples, G-PCC decoder 300 obtains a mode indication signaled in a bitstream that indicates an inter prediction mode for the current point. The inter predictor for the respective dimension may be the first next point or the second next point depending on the inter prediction mode for the current point.

G-PCC decoder 300 may decode the current point based on the predictor for the current point (1308). For example, G-PCC decoder 300 may obtain residual data for the current point based on data signaled in a bitstream (e.g., geometry bitstream 203). In this example, G-PCC decoder 300 may determine a position of the current point by adding each coordinate value of the residual data for the current point from a corresponding coordinate value of the predictor for the current point.

In accordance with one or more techniques of this disclosure, G-PCC encoder 200 and G-PCC decoder 300 may perform residual prediction. For a point in the current frame of point cloud data, G-PCC encoder 200 may derive an inter residual value based on an inter predictor. In some examples, irrespective of whether a previously reconstructed/decoded point is encoded with residual prediction, an inter residual value may be derived associated with the point. G-PCC encoder 200 and G-PCC decoder 300 may use an inter residual value associated with a point p for predicting the residuals of points that succeed the point p in coding order. G-PCC encoder 200 may determine a residual to signal based on the residual of the current point derived, e.g., as described above with respect to FIGS. 7-13, and the predicted residual. For example, G-PCC encoder 200 may determine the signaled residual by subtracting each coordinate value of the residual of the current point from the corresponding coordinate value of the predicted residual. In this example, G-PCC decoder 300 may determine the residual of the current point by adding coordinate values in the signaled residual to corresponding coordinate values in the predicted residual. G-PCC decoder 300 may then use the position of the inter prediction point for the current point and the residual for the current point to determine a position of the current point.

Thus, in some examples, G-PCC decoder 300 may generate a residual predictor for a current point. As part of generating the residual predictor for the current point, G-PCC decoder 300 may determine a predictor for a previous point and determine the residual predictor for the current point based on the predictor for the current point and a position of the previous point. G-PCC decoder 300 may obtain residual data for the current point based on data signaled in a bitstream. As part of decoding the current point, G-PCC decoder 300 may decode the current point based on the predictor for the current point, the residual predictor for the current point, and the residual data for the current point.

Figure 14:
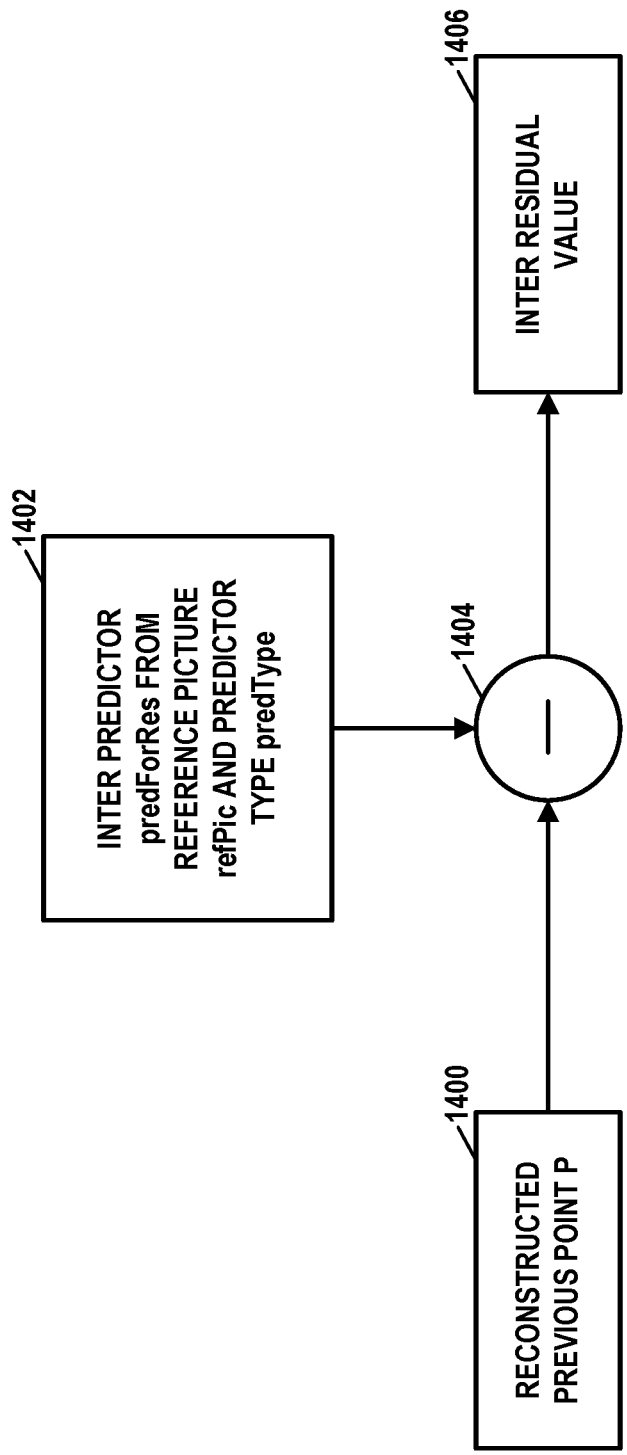
FIG. 14 is a block diagram illustrating an example process for generating an inter residual value according to techniques of this disclosure.

FIG. 14 is a block diagram illustrating an example process for generating an inter residual value according to techniques of this disclosure. In the example of FIG. 14, G-PCC encoder 200 or G-PCC decoder 300 may identify a reconstructed previous point p of a current frame (1400). The reconstructed previous point p may be a point that G-PCC encoder 200 or G-PCC decoder 300 reconstructed prior to starting to encode or decode a current point of the current frame. Additionally, in the example of FIG. 14, G-PCC encoder 200 or G-PCC decoder 300 may determine an inter predictor for the reconstructed previous point p (1402). The inter predictor for the reconstructed previous point p may be denoted predForRes. predForRes may be a point in a reference picture (refPic). predForRes may be a Next predictor or a NextNext predictor. This disclosure uses the term "predictor type" (predType) to indicate whether predForRes is a Next predictor or a NextNext predictor. Processes for determining Next predictors and NextNext predictors are described elsewhere in this disclosure, e.g., with respect to FIG. 7 and FIG. 9.

Furthermore, in the example of FIG. 14, G-PCC encoder 200 or G-PCC decoder 300 may subtract predForRes from the position of the reconstructed previous point p (1404) to derive an inter residual value (i.e., a residual predictor) (1406). In other words, for each coordinate value of a position of predForRes, G-PCC encoder 200 or G-PCC decoder 300 may subtract the coordinate value of the position of predForRes from a corresponding coordinate value of the position of reconstructed previous point p. Thus, in some examples, G-PCC encoder 200 or G-PCC decoder 300 may derive a predictor from a reference picture and a predictor type; and determine, based on the predictor, an inter residual value for a point of a current point cloud frame of the point cloud data.

When more than one type of residual predictor may be used for a point, more than one inter residual value may be derived. Therefore, G-PCC encoder 200 and G-PCC decoder 300 may derive different inter residual values for each type of residual predictor. For example, for a given reference picture and a predictor type, an inter residual value may be derived. In some examples, there are two types of reference frames (e.g., a zero compensated reference frame and a global motion compensated reference frame) and there are two types of predictors (e.g., Next and NextNext). Because there are four combinations of reference picture types and predictor types, G-PCC encoder 200 and G-PCC decoder 300 may potentially derive four inter residual values.

Figure 15:
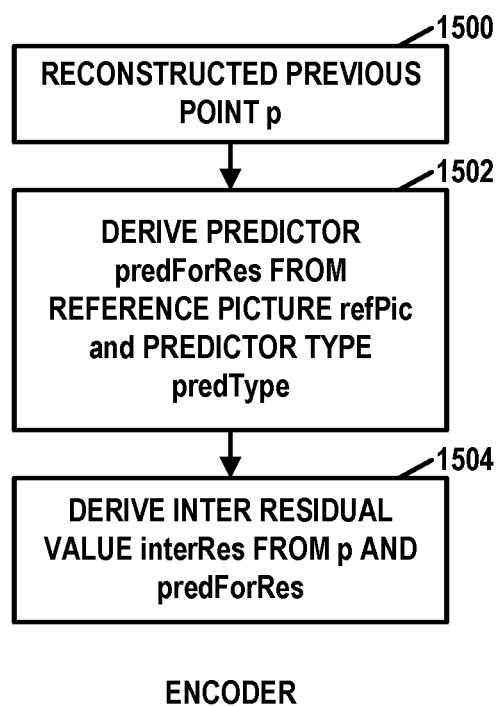
FIG. 15 is a flowchart illustrating example steps used to derive the inter residual value at the G-PCC encoder for a point p corresponding to reference picture refPic and predictor type predType in accordance with one or more techniques of this disclosure.
Figure 16:
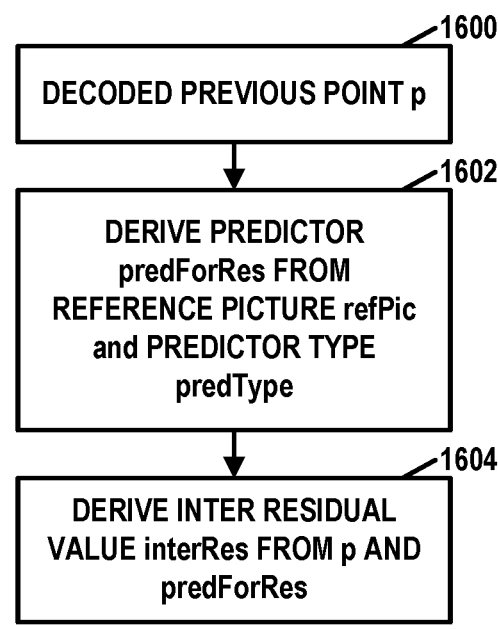
FIG. 16 is a flowchart illustrating example steps used to derive the inter residual value at the G-PCC decoder for a point p corresponding to reference picture refPic and predictor type predType in accordance with one or more techniques of this disclosure.

FIG. 15 and FIG. 16 show illustrations of example steps used to derive the inter residual value at G-PCC encoder 200 and G-PCC decoder 300 for a point p corresponding to reference picture refPic and predictor type predType, in accordance with one or more techniques of this disclosure.

In the example of FIG. 15, G-PCC encoder 200 may determine a reconstructed previous point p (1500). For one or more combinations of reference picture type (refPic) and predictor type (predType), G-PCC encoder 200 may then derive a predictor (predForRes) from the reference picture type and the predictor type (1502). The resulting predictors for the different combinations of reference picture type (refPic) and predictor type (predType) may be referred to as inter residual value candidates. G-PCC encoder 200 may derive an inter residual value (interRes) from reconstructed previous point p and the predictor (predForRes) (1504).

In the example of FIG. 16, G-PCC decoder 300 may determine a decoded previous point p (1600). For one or more combinations of reference picture type (refPic) and predictor type (predType), G-PCC decoder 300 may then derive a predictor (predForRes) from the reference picture type and the predictor type (1602). The resulting predictors for the different combinations of reference picture type (refPic) and predictor type (predType) may be referred to as inter residual value candidates. G-PCC decoder 300 may derive an inter residual value (interRes) from reconstructed previous point p and the predictor (predForRes) (1604).

For a previous point p, G-PCC encoder 200 and G-PCC decoder 300 may update an inter residual value buffer based on the inter residual value for each reference picture type and predictor type. The inter residual value derived for a given point p is used to predict the residual for one or more points that are coded succeeding the given point p. The buffer is maintained at G-PCC encoder 200 and G-PCC decoder 300.

In some examples, a list of inter residual value candidates can include a list of 2-tuples, each tuple containing a reference picture type (e.g., zero-compensated reference frame (ZeroRefPic), global motion compensated reference frame (GlobRefPic)) and a predictor type (e.g., Next, Next-Next). Thus, the table may include entries for each of the following combinations of reference picture type and predictor type: (ZeroRefPic, Next), (ZeroRefPic, NextNext), (GlobRefPic, Next), (GlobRefPic, NextNext). For each point, each of the inter residual value candidates may be stored in a buffer as shown in Table 1 below:

TABLE 1

| Inter residual value candidates | radius residual | azimuth residual | laser ID residual |
|---|---|---|---|
| (ZeroRefPic, Next), (ZeroRefPic, NextNext) (GlobRefPic, Next) (GlobRefPic, NextNext) | | | |

In accordance with techniques of this disclosure, G-PCC encoder 200 and G-PCC decoder 300 may apply a residual predictor mode. The residual predictor mode specifies a process to obtain a residual predictor using one or more points that were coded previously.

Figure 17:
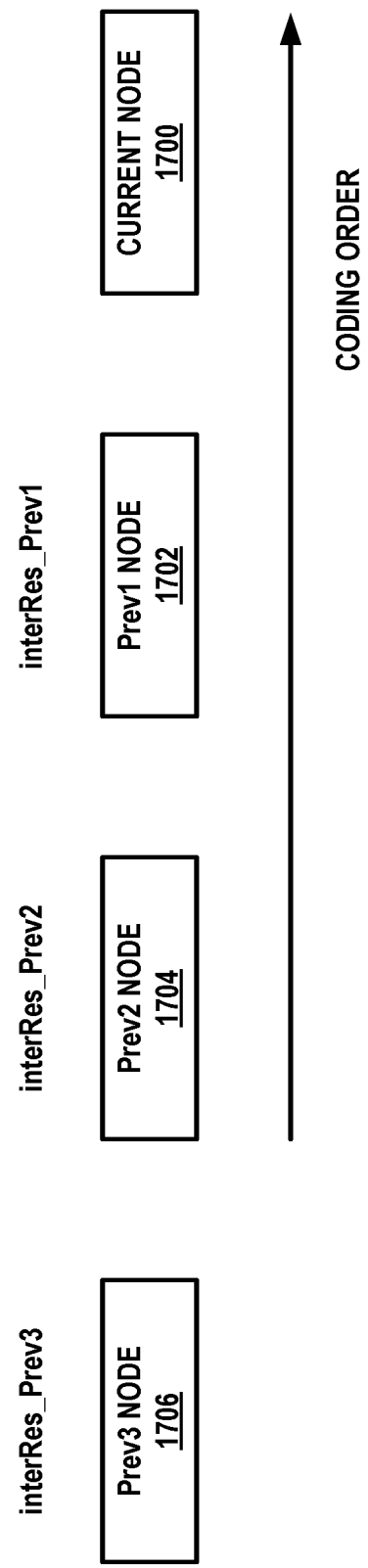
FIG. 17 is a conceptual diagram illustrating an example of previous nodes in coding order according to techniques of this disclosure.

FIG. 17 is a conceptual diagram illustrating an example of previous nodes in coding order. The previous nodes (points) precede a current node 1700 in coding order (i.e., encoding and decoding order). In some examples, PrevN may denote the N-th preceding node in coding order, and interRes_PrevN may denote the inter residual value for the N-th preceding node as shown in FIG. 17. In other words, in FIG. 17, the three preceding nodes (1702, 1704, 1706) in the coding order are depicted. In some examples, PrevN may denote an N-th level parent node (e.g., Prev1 is the parent node, Prev2 is the grandparent node, as so on). Residual predictor mode 0 may refer to a 0-th order residual predictor. The residual predictor for the current node may be obtained from the inter residual value interRes as follows:

Residual predictor for current node=interRes_Prev1

The residual predictor may be specified for a particular reference picture and residual predictor type. For each combination of reference picture and residual predictor type, a residual predictor may be derived for the current node. So, a more precise definition may be as follows:

Residual predictor for current node associated with reference picture refPic and residual predictor type resPredType=interRes_Prev1(refPic,resPredType)

Similarly, residual predictor mode 1 may refer to a Pt order residual predictor. The residual predictor for the current node may be obtained as follows:

Residual predictor for current node=2*interRes_Prev1−interRes_Prev2

As described earlier, the radius, azimuth and laser ID may each use the same or different reference picture, residual predictor type and residual predictor mode. The residual predictor mode may be specified explicitly using a syntax element or be indicated using a inter prediction mode value as described below with respect with the discussion of the inter prediction candidate list.

In some examples, for a given node, a particular reference picture, residual predictor type and residual predictor mode are specified; resPred may be the corresponding residual predictor. The residual value that is coded in the bitstream is derived as shown in the example of FIG. 18.

Figure 18:
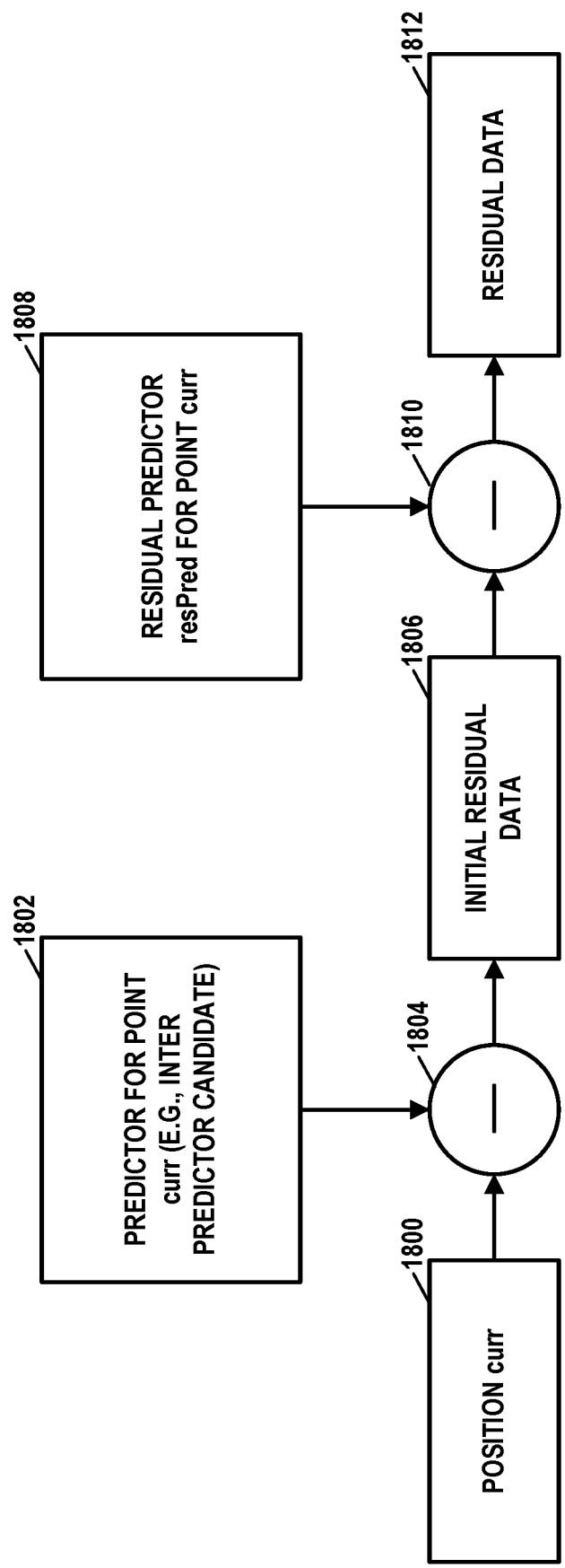
FIG. 18 is a conceptual diagram illustrating an example process for encoding a residual value in accordance with one or more techniques of this disclosure.

FIG. 18 is a conceptual diagram illustrating an example process for encoding a residual value, in accordance with one or more techniques of this disclosure. In the example of FIG. 18, encoding prediction unit 211 may obtain a position of a current point curr of a current frame of point cloud data (1800). Additionally, encoding prediction unit 211 may generate a predictor for curr (1802). The predictor for curr may be an inter predictor candidate, an intra predictor candidate, or a predictor generated in some other manner. Encoding prediction unit 211 may subtract coordinate values of the position of curr from corresponding coordinate values of the predictor for curr (1804). The result of this subtraction may be an initial residual value (1806), i.e., a residual value before residual prediction.

Furthermore, in the example of FIG. 18, encoding prediction unit 211 may generate a residual predictor resPred for the current point curr (1808). Encoding prediction unit 211 may subtract coordinate values of the initial residual data from corresponding coordinate values of the residual predictor resPred for the current point curr (1810). The result of this subtraction may be residual data to be signaled in a bitstream (1812).

Other intermediate steps may be applied that are not depicted in FIG. 18. For example, G-PCC encoder 200 may quantize and/or scale residual values before being encoded in the bitstream.

The inter prediction mode used for encoding a point may be specified in the bitstream to enable G-PCC decoder 300 to reconstruct the point. One or more methods described above may be applied to encode a point, and the indication in the bitstream may be a mode value, or a combination of syntax elements that indicate the encoding mode. G-PCC encoder 200 and G-PCC decoder 300 may generate an inter predictor candidate list by specifying a list of inter prediction candidates. Each inter prediction candidate may be chosen by specifying one or more of the following parameters:

Ref: Reference picture used
PredType: Inter predictor candidate used (e.g., Next, NextNext, etc.)
   If different predictors are used for radius, azimuth, laser ID, then they may also be specified
ResPredType: Residual prediction that is applied
   If different predictors are used for radius, azimuth, laser ID, then they may also be specified Thus, the inter predictor candidate may be specified as a 3-tuple (Ref, PredType, ResPredType) to specify the coding method. The following tables specify some examples of various values of (Ref, PredType, ResPredType):

TABLE 2

Potential candidates for reference picture Ref

Potential values

| | |
|---|---|
| Z (Zero) | Zero compensated reference frame |
| G (Global) | Global motion compensated reference frames |
| M (Mixed) | Reference frame obtained by taking values from one or more reference frames (e.g., radius and laserID from Global, and azimuth from Zero) |

TABLE 3

Potential candidates for inter predictor type PredType

Potential values

| | |
|---|---|
| N (Next) | InterPredPt as specified in above with respect to FIG. 7 |

TABLE 3-continued

Potential candidates for inter predictor type PredType

Potential values

| | |
|---|---|
| NN (NextNext) | InterPredPt as specified with respect to FIG. 9 |
| I0 | Intra Mode 0 predictor |
| I1 | Intra Mode 1 predictor |
| I2 | Intra Mode 2 predictor |
| I3 | Intra Mode 3 predictor |

If radius, azimuth, laser ID use different predictors, they may be specified as follow:
[R-N, A-N, L-N]: radius, azimuth and laserID are predicted using the Next predictor
[R-N, A-I2, L-I2]: radius is predicted using the next predictor, azimuth and laser ID are predicted using the intra mode 2 predictor.

TABLE 4

Potential candidates for residual predictor type ResPredType

Potential values

| | |
|---|---|
| 0 | 0-th order predictor for radius |
| 1 | $1^{st}$ order predictor for radius |

If radius, azimuth, laser ID use different predictors, they may be specified as follows:
[R-0, A-0, L-0]: residual of radius, azimuth and laserID are predicted using the 0-th order residual predictor
[R-1, ,]: residual of radius is predicted using the 1st order residual predictor; no residual prediction is applied for azimuth and laserID.

Some examples of inter prediction candidates thus defined are as follows:
1. (Z, N,)—zero reference picture is used, with the Next predictor used for radius, azimuth and laser ID; no residual prediction is applied
2. (Z, NN,)—zero reference picture is used, with the NextNext predictor used for radius, azimuth and laser ID.
3. (Z, [R-N, A-I2, L-I2],)—zero reference picture is used, with the radius predicted using the Next predictor and azimuth and laser ID predicted using intra mode 2 predictor.
4. (M, N, [R0, ,])—mixed reference picture is used, with the Next predictor used for radius, azimuth and laser ID, and $0^{th}$ order radius residual prediction is applied; no residual prediction for azimuth and laser ID.
5. (M, NN,)—mixed reference picture is used, with the NextNext predictor used for radius, azimuth and laser ID; no residual prediction is applied.

An inter prediction candidate list may be generated using one or more inter prediction candidates. E.g., a list with 3 candidates may be generated as follows:
1. (Z, N, R0)
2. (M, N, R0)
3. (M, NN,)

Another example with 4 candidates may be generated as follows:
1. (Z, N, [R0, ,])
2. (M, N, [R0, ,])
3. (M, NN,)
4. (M, N, [R0, ,])

Another example with 2 candidates may be generated as follows (in some cases mixed reference picture M may be replace by zero compensated reference Z):
1. (M, N, [R0, ,])
2. (M, NN,)

Another example with 2 candidates may be generated as follows (in some cases mixed reference picture M may be replace by zero compensated reference Z):
1. (M, N, [R0, ,])
2. (M, NN, [R0, ,])

Another example with 4 candidates may be generated as follows (in some cases mixed reference picture M may be replace by zero compensated reference Z):
1. (M, N, [R0, ,])
2. (M, NN, [R0, ,])
3. (G, N,)
4. (G, NN,)

Another example with 4 candidates may be generated as follows (in some cases mixed reference picture M may be replace by zero compensated reference Z):
1. (M, N, [R0, ,])
2. (M, NN,)
3. (G, N,)
4. (G, NN,)

Once an inter prediction candidate list is specified, G-PCC encoder 200 may signal an index to the inter prediction list for a point to indicate the inter prediction mode used to encode a point. The inter prediction candidate list may be pre-determined at G-PCC encoder 200 or G-PCC decoder 300, or may be signaled in the bitstream.

Thus, in some examples, G-PCC encoder 200 or G-PCC decoder 300 may generate an inter prediction candidate list that includes a plurality of inter prediction candidates. The inter prediction candidates may include a predictor ultimately used as a predictor for the current point. Each of the inter prediction candidates includes a predictor for each of the dimensions. The predictor for the dimension may be a combination of: a reference picture, a prediction type in a plurality of prediction types, and a residual prediction order. In some examples, the prediction types include one or more inter prediction types and one or more intra prediction types.

In one example implementation, residual prediction may be applied to the inter predicted residual in order to improve the encoding efficiency. A mode value is determined to encode the point position. The mode value may indicate whether the current node is predicted with an intra prediction mode or an inter prediction mode. If the mode corresponds to an inter-predicted mode, a reference picture associated with the mode may be chosen (note that the reference picture may correspond to a mixed reference picture). G-PCC encoder 200 may derive a predictor based on the reference picture and the predictor type associated with the mode. This predictor may be used to derive an initial residual value (e.g., initial residual data in FIG. 18). G-PCC encoder 200 may derive the residual predictor for the point associated with the reference picture and predictor type and residual predictor mode. G-PCC encoder 200 may then compute the second residual value based on the residual predictor and initial residual value. G-PCC encoder 200 may encode this second residual in the bitstream.

FIG. 19 is a flowchart that illustrate an example of how residual prediction may be used to encode a point position in accordance with one or more techniques of this disclosure. In the example of FIG. 19, encoding prediction unit 211 of G-PCC encoder 200 may determine a mode to encode a position of a point (1900). The mode may indicate whether a predictor for the point is an intra predictor, a Next inter predictor, or a NextNext inter predictor. Additionally, G-PCC encoder 200 may select a reference picture associated with the mode (1902). In cases where the predictor is an intra predictor, the reference picture associated with the mode may be the current frame. In cases where the predictor is an inter predictor, the reference picture associated with the mode may be a zero-compensated reference frame or a global motion compensated reference frame or a mixed reference frame. In some examples where the mode is intra prediction, encoding prediction unit 211 does not select a reference picture associated with the mode.

Encoding prediction unit 211 may derive a predictor for the current point (1904). For example, in cases where the prediction type for the current point is intra prediction, Encoding prediction unit 211 may derive the predictor for the current point using intra prediction, e.g., as described elsewhere in this disclosure. In cases where the prediction type for the current point is inter prediction and the reference picture is a zero-compensated reference frame or a global compensated reference frame, encoding prediction unit 211 may derive the predictor for the current point according to the inter prediction techniques described elsewhere in this disclosure, such as the conventional inter prediction techniques. In cases where the prediction type for the current point is inter prediction and the reference picture is a mixed reference picture, encoding prediction unit 211 may derive the predictor for the current point, e.g., using the process described with respect to FIG. 12.

Encoding prediction unit 211 may derive a residual predictor for the current point (1906). Encoding prediction unit 211 may perform any of processes described elsewhere in this disclosure for deriving the residual predictor, such as the process described with respect to FIG. 15.

Encoding prediction unit 211 may derive residual data for the current point using the position of the current point, the predictor, and the residual predictor (1908). For example, encoding prediction unit 211 may derive the residual data by subtracting, for each coordinate value of a set of coordinates defining the position of the current point, the coordinate values of the predictor and residual predictor from the coordinate value of the current point.

G-PCC encoder 200 may encode the residual data in the bitstream, e.g., geometry bitstream 203 (1910). For example, G-PCC encoder 200 may include one or more syntax elements in the bitstream that indicate the residual data.

In the example of FIG. 20, decoding prediction unit 313 of G-PCC decoder 300 may determine a mode to decode a position of a point (2000). The mode may indicate whether a predictor for the point is an intra predictor, a Next inter predictor, or a NextNext inter predictor. In some examples, decoding prediction unit 313 determines the mode based on one or more syntax elements signaled in a bitstream (e.g., geometry bitstream 203). In some examples, decoding prediction unit 313 may infer the mode based on one or more other factors or parameters.

Additionally, decoding prediction unit 313 may select a reference picture associated with the mode (2002). In cases where the predictor is an intra predictor, the reference picture associated with the mode may be the current frame. In cases where the predictor is an inter predictor, the reference picture associated with the mode may be a zero-compensated reference frame or a global motion compensated reference frame or a mixed reference frame. In some examples, decoding prediction unit 313 determines the reference picture based on one or more syntax elements signaled in a bitstream (e.g., geometry bitstream 203). In some examples, decoding prediction unit 313 may infer the reference picture based on one or more other factors or parameters. In some examples where the mode is intra prediction, decoding prediction unit 313 does not select a reference picture associated with the mode.

Decoding prediction unit 313 may derive a predictor for the current point (2004). For example, in cases where the prediction type for the current point is intra prediction, decoding prediction unit 313 may derive the predictor for the current point using intra prediction, e.g., as described elsewhere in this disclosure. In cases where the prediction type for the current point is inter prediction and the reference picture is a zero-compensated reference frame or a global compensated reference frame, decoding prediction unit 313 may derive the predictor for the current point according to the inter prediction techniques described elsewhere in this disclosure, such as the conventional inter prediction techniques. In cases where the prediction type for the current point is inter prediction and the reference picture is a mixed reference picture, G-PCC encoder 200 may derive the predictor for the current point, e.g., using the process described with respect to FIG. 13.

Decoding prediction unit 313 may derive a residual predictor for the current point (2006). Decoding prediction unit 313 may perform any of processes described elsewhere in this disclosure for deriving the residual predictor, such as the process described with respect to FIG. 15.

Furthermore, in the example of FIG. 20, G-PCC decoder 300 may decode residual data for the current point from a bitstream (2008). In some examples, geometry arithmetic decoding unit 302 performs arithmetic decoding on data in the bitstream to determine values of syntax elements that specify the residual data. The residual data for the current point may include a coordinate value for each dimension of a coordinate system. Decoding prediction unit 313 may reconstruct a position of the current point using the residual data, the predictor for the current point, and the residual predictor for the current point (2010). For example, decoding prediction unit 313 may derive the residual data by adding, for each coordinate value of a set of coordinates defining the position of the current point, the coordinate value of the predictor, the coordinate value of the predictor, and the coordinate value of the residual predictor.

Thus, in some examples, G-PCC encoder 200 or G-PCC decoder 300 may determine a mode to encode or decode a position of a point; determine a reference picture associated with the mode; determine a predictor value for the point; and determine a residual predictor value for the point. G-PCC encoder 200 may determine a residual using the position of the point, the predictor value, and the residual predictor value. G-PCC encoder 200 may encode the residual in a bitstream. G-PCC decoder 300 may decode the residual and reconstruct the position of the point based on the residual, the predictor value, and the residual predictor value.

In one example, residual prediction is only applied to a subset of points, the subset determined by explicit signaling or identification (e.g., object/ground points). Here, ground/object points may refer to a classification of points based on whether the objects are static across frames with regard to a vehicle (e.g., the road would be considered static/ground points, whereas buildings would be considered object points because from the point of the view of the vehicle, there will be relative motion).

In another example, residual prediction of one type may be applied to object points and residual prediction of another type may be applied to ground points. E.g., the inter prediction candidate (Z, N, [R0, ,]) may apply to ground points and (M, N, [R0, ,]) may apply to object points.

In a further example, residual prediction may also apply to intra predicted points. For intra predicted points, one or more dimensions may use residual prediction based on the intra residual value of one or more points that precede in the coding order.

In this way, G-PCC encoder 200 may identify a previous point in a current frame of the point cloud data. The previous point was encoded previous to a current point of the current frame. G-PCC encoder 200 may determine an inter predictor for the previous point. G-PCC encoder 200 may determine an inter residual predictor based on the inter predictor for the previous point and a position of the previous point. G-PCC encoder 200 may determine an inter predictor for the current point. G-PCC encoder 200 may determine a residual of the current point based on the inter predictor for the current point and a position of the current point. G-PCC encoder 200 may determine a residual difference for the current point based on the inter residual predictor and the residual for the current point. G-PCC encoder 200 may signal the residual difference for the current point. In some examples, the residual predictor is a first residual predictor and G-PCC encoder 200 may determine a plurality of residual predictors that includes the first residual predictor. In such examples, G-PCC encoder 200 may select a residual predictor (e.g., the first residual predictor) from among the residual predictors.

Similarly, in some examples, G-PCC decoder 300 may obtain a residual difference for a current point of a current frame of the point cloud data. G-PCC decoder 300 may identify a previous point in the current frame of the point cloud data. The previous point was decoded previous to the current point. G-PCC decoder 300 may determine a predictor for the previous point. G-PCC decoder 300 may determine a residual predictor based on the predictor for the previous point and a position of the previous point. G-PCC decoder 300 may determine a predictor for the current point. G-PCC decoder 300 may determine a position of the current point based on the predictor for the current point, the residual predictor, and the residual difference. In some examples, the residual predictor is a first residual predictor and G-PCC decoder 300 may determine a plurality of residual predictors that includes the first residual predictor. In such examples, G-PCC decoder 300 may select a residual predictor (e.g., the first residual predictor) from among the residual predictors.

In some examples, the previous point is a first previous point and, as part of determining the inter predictor for the previous point, G-PCC encoder 200 or G-PCC decoder 300 may determine a predictor type and determine a reference frame. G-PCC encoder 200 or G-PCC decoder 300 may identify a second previous point of the current frame. The second previous point is a point of the current frame encoded prior to the first previous point. G-PCC encoder 200 or G-PCC decoder 300 may identify a second reference position in the reference frame. The second reference position is a position having a laser identifier and a scaled azimuth matching a laser identifier and an azimuth of the second previous point in the current frame. G-PCC encoder 200 or G-PCC decoder 300 may determine the inter predictor for the second previous point based on the second reference position and the predictor type. The inter predictor for the second previous point is a point in the determined reference frame. As part of determining the inter predictor for the current point, G-PCC encoder 200 and G-PCC decoder 300 may identify a second reference position in the reference frame. The second reference position is a position having a laser identifier and a scaled azimuth matching a laser identifier and an azimuth of the second previous point in the current frame. G-PCC encoder 200 and G-PCC decoder 300 may determine the inter predictor for the current point based on the second reference position and the predictor type, the inter predictor for the current point being a point in the determined reference frame.

Figure 21:
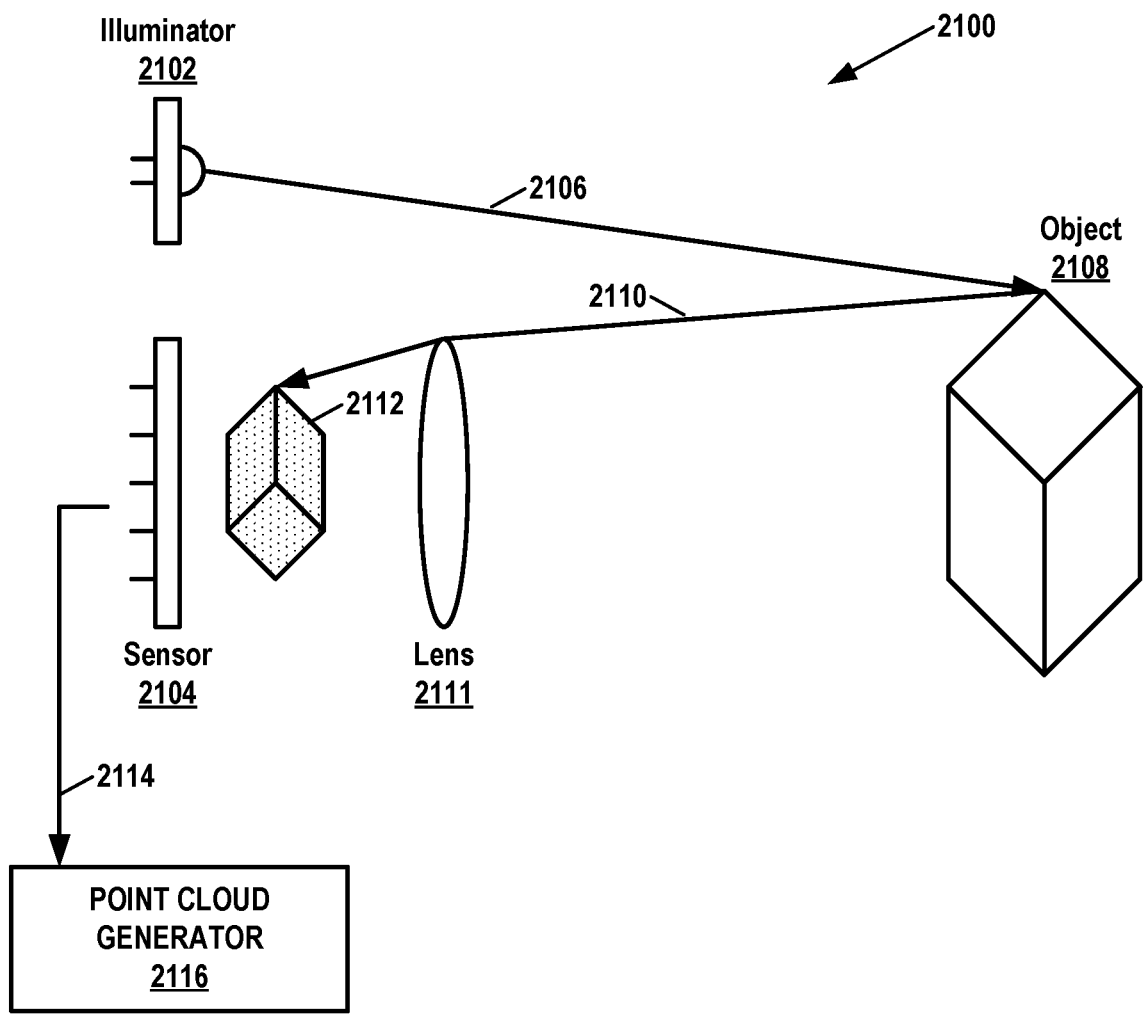
FIG. 21 is a conceptual diagram illustrating an example range-finding system that may be used with one or more techniques of this disclosure.

FIG. 21 is a conceptual diagram illustrating an example range-finding system 2100 that may be used with one or more techniques of this disclosure. In the example of FIG. 21, range-finding system 2100 includes an illuminator 2102 and a sensor 2104. Illuminator 2102 may emit light 2106. In some examples, illuminator 2102 may emit light 2106 as one or more laser beams. Light 2106 may be in one or more wavelengths, such as an infrared wavelength or a visible light wavelength. In other examples, light 2106 is not coherent, laser light. When light 2106 encounters an object, such as object 2108, light 2106 creates returning light 2110. Returning light 2110 may include backscattered and/or reflected light. Returning light 2110 may pass through a lens 2111 that directs returning light 2110 to create an image 2112 of object 2108 on sensor 2104. Sensor 2104 generates signals 2114 based on image 2112. Image 2112 may comprise a set of points (e.g., as represented by dots in image 2112 of FIG. 21).

In some examples, illuminator 2102 and sensor 2104 may be mounted on a spinning structure so that illuminator 2102 and sensor 2104 capture a 360-degree view of an environment (e.g., a spinning LIDAR sensor). In other examples, range-finding system 2100 may include one or more optical components (e.g., mirrors, collimators, diffraction gratings, etc.) that enable illuminator 2102 and sensor 2104 to detect ranges of objects within a specific range (e.g., up to 360-degrees). Although the example of FIG. 21 only shows a single illuminator 2102 and sensor 2104, range-finding system 2100 may include multiple sets of illuminators and sensors.

In some examples, illuminator 2102 generates a structured light pattern. In such examples, range-finding system 2100 may include multiple sensors 2104 upon which respective images of the structured light pattern are formed. Range-finding system 2100 may use disparities between the images of the structured light pattern to determine a distance to an object 2108 from which the structured light pattern backscatters. Structured light-based range-finding systems may have a high level of accuracy (e.g., accuracy in the sub-millimeter range), when object 2108 is relatively close to sensor 2104 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 2100 is a time of flight (ToF)-based system. In some examples where range-finding system 2100 is a ToF-based system, illuminator 2102 generates pulses of light. In other words, illuminator 2102 may modulate the amplitude of emitted light 2106. In such examples, sensor 2104 detects returning light 2110 from the pulses of light 2106 generated by illuminator 2102. Range-finding system 2100 may then determine a distance to object 2108 from which light 2106 backscatters based on a delay between when light 2106 was emitted and detected and the known speed of light in air). In some examples, rather than (or in addition to) modulating the amplitude of the emitted light 2106, illuminator 2102 may modulate the phase of the emitted light 2106. In such examples, sensor 2104 may detect the phase of returning light 2110 from object 2108 and determine distances to points on object 2108 using the speed of light and based on time differences between when illuminator 2102 generated light 2106 at a specific phase and when sensor 2104 detected returning light 2110 at the specific phase.

In other examples, a point cloud may be generated without using illuminator 2102. For instance, in some examples, sensors 2104 of range-finding system 2100 may include two or more optical cameras. In such examples, range-finding system 2100 may use the optical cameras to capture stereo images of the environment, including object 2108. Range-finding system 2100 may include a point cloud generator 2116 that may calculate the disparities between locations in the stereo images. Range-finding system 2100 may then use the disparities to determine distances to the locations shown in the stereo images. From these distances, point cloud generator 2116 may generate a point cloud.

Sensors 2104 may also detect other attributes of object 2108, such as color and reflectance information. In the example of FIG. 21, a point cloud generator 2116 may generate a point cloud based on signals 2114 generated by sensor 2104. Range-finding system 2100 and/or point cloud generator 2116 may form part of data source 104 (FIG. 1). Hence, a point cloud generated by range-finding system 2100 may be encoded and/or decoded according to any of the techniques of this disclosure. Inter prediction and residual prediction, as described in this disclosure may reduce the size of the encoded data.

Figure 22:
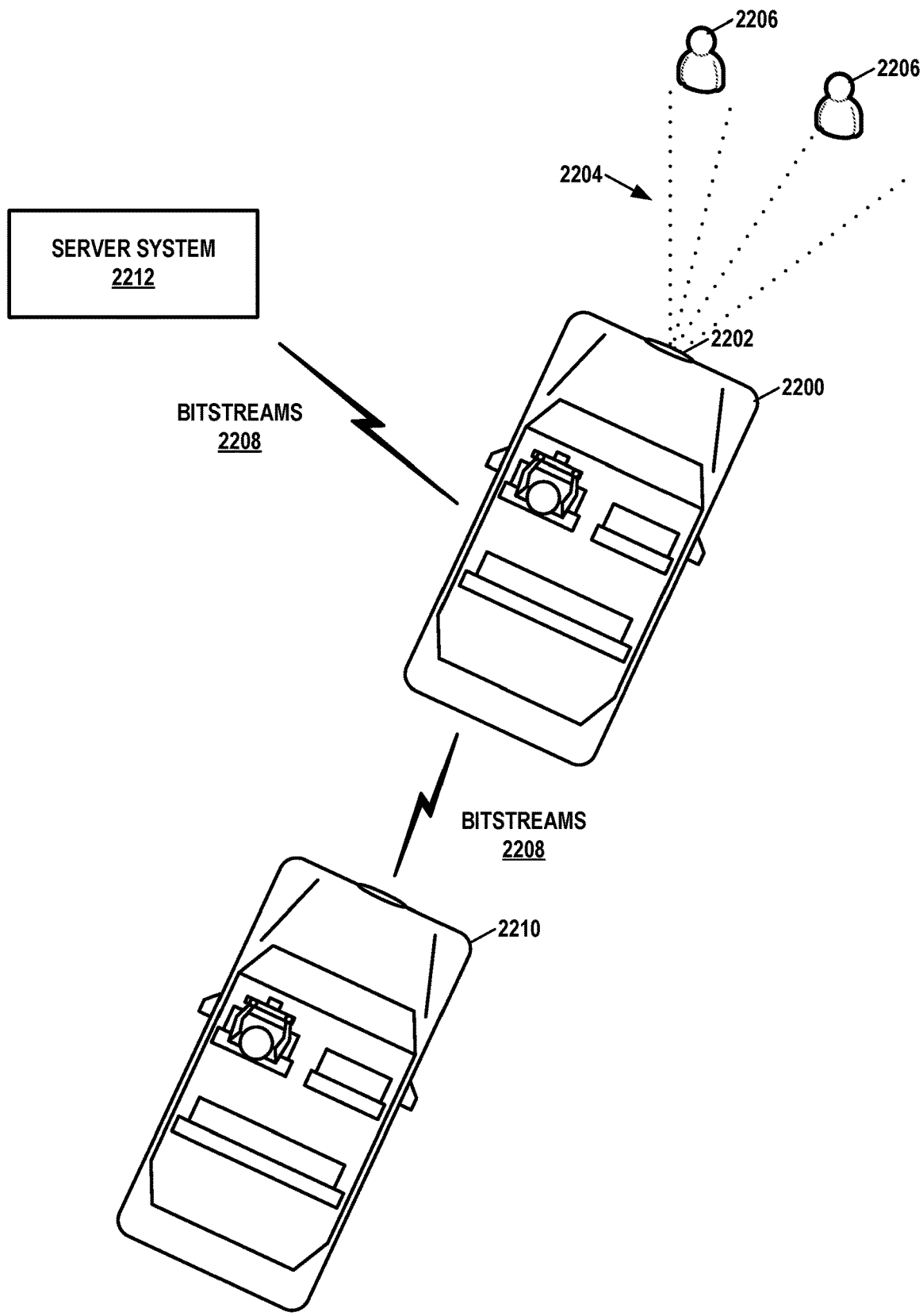
FIG. 22 is a conceptual diagram illustrating an example vehicle-based scenario in which one or more techniques of this disclosure may be used.

FIG. 22 is a conceptual diagram illustrating an example vehicle-based scenario in which one or more techniques of this disclosure may be used. In the example of FIG. 22, a vehicle 2200 includes a range-finding system 2202. Range-finding system 2202 may be implemented in the manner discussed with respect to FIG. 21. Although not shown in the example of FIG. 22, vehicle 2200 may also include a data source, such as data source 104 (FIG. 1), and a G-PCC encoder, such as G-PCC encoder 200 (FIG. 1). In the example of FIG. 22, range-finding system 2202 emits laser beams 2204 that reflect off pedestrians 2206 or other objects in a roadway. The data source of vehicle 2200 may generate a point cloud based on signals generated by range-finding system 2202. The G-PCC encoder of vehicle 2200 may encode the point cloud to generate bitstreams 2208, such as geometry bitstream (FIG. 2) and attribute bitstream (FIG. 2). Inter prediction and residual prediction, as described in this disclosure may reduce the size of the geometry bitstream. Bitstreams 2208 may include many fewer bits than the unencoded point cloud obtained by the G-PCC encoder.

An output interface of vehicle 2200 (e.g., output interface 108 (FIG. 1) may transmit bitstreams 2208 to one or more other devices. Bitstreams 2208 may include many fewer bits than the unencoded point cloud obtained by the G-PCC encoder. Thus, vehicle 2200 may be able to transmit bitstreams 2208 to other devices more quickly than the unencoded point cloud data. Additionally, bitstreams 2208 may require less data storage capacity on a device.

In the example of FIG. 22, vehicle 2200 may transmit bitstreams 2208 to another vehicle 2210. Vehicle 2210 may include a G-PCC decoder, such as G-PCC decoder 300 (FIG. 1). The G-PCC decoder of vehicle 2210 may decode bitstreams 2208 to reconstruct the point cloud. Vehicle 2210 may use the reconstructed point cloud for various purposes. For instance, vehicle 2210 may determine based on the reconstructed point cloud that pedestrians 2206 are in the roadway ahead of vehicle 2200 and therefore start slowing down, e.g., even before a driver of vehicle 2210 realizes that pedestrians 2206 are in the roadway. Thus, in some examples, vehicle 2210 may perform an autonomous navigation operation based on the reconstructed point cloud.

Additionally or alternatively, vehicle 2200 may transmit bitstreams 2208 to a server system 2212. Server system 2212 may use bitstreams 2208 for various purposes. For example, server system 2212 may store bitstreams 2208 for subsequent reconstruction of the point clouds. In this example, server system 2212 may use the point clouds along with other data (e.g., vehicle telemetry data generated by vehicle 2200) to train an autonomous driving system. In other example, server system 2212 may store bitstreams 2208 for subsequent reconstruction for forensic crash investigations.

Figure 23:
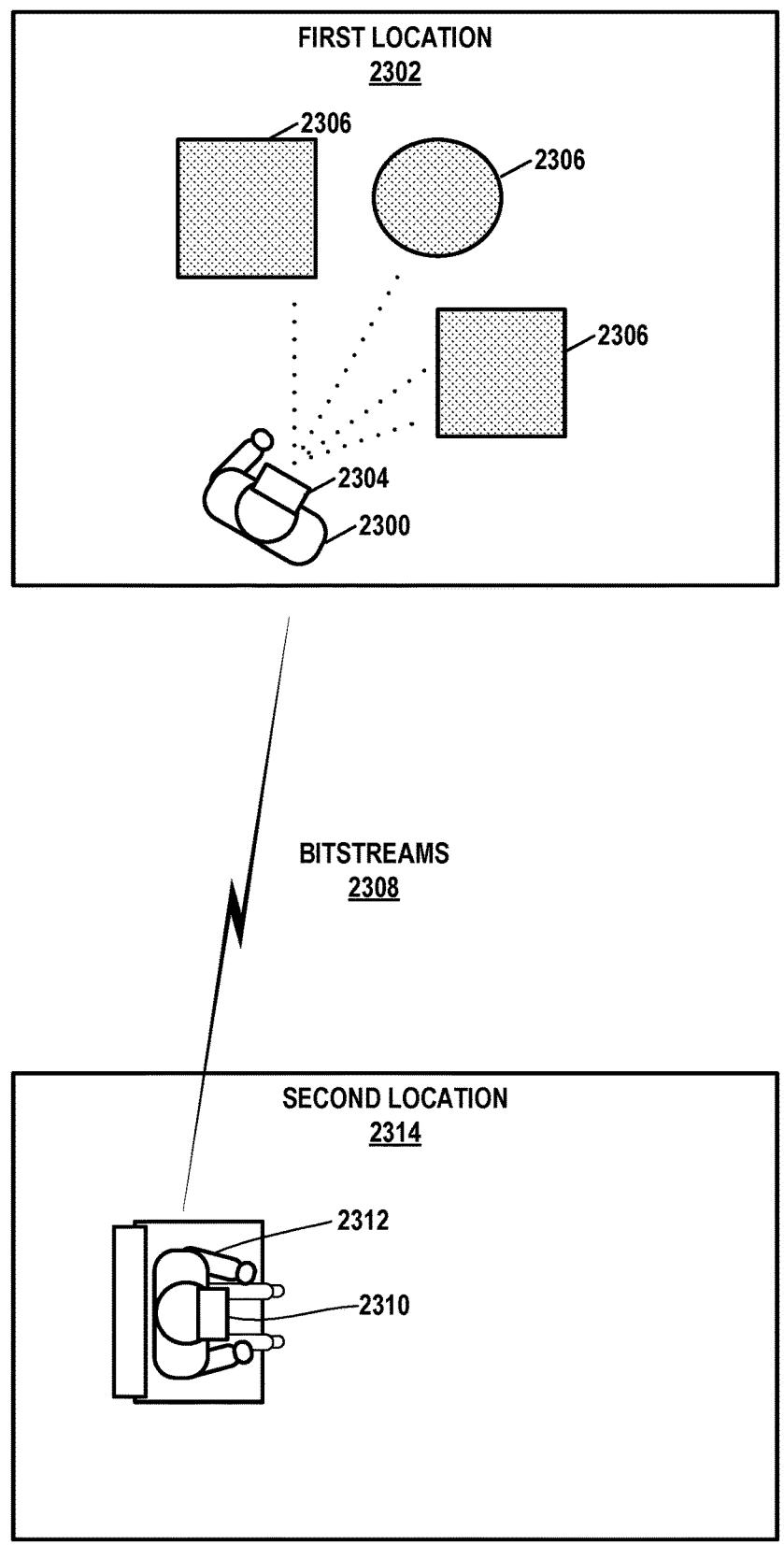
FIG. 23 is a conceptual diagram illustrating an example extended reality system in which one or more techniques of this disclosure may be used.

FIG. 23 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 23, a user 2300 is located in a first location 2302. User 2300 wears an XR headset 2304. As an alternative to XR headset 2304, user 2300 may use a mobile device (e.g., mobile phone, tablet computer, etc.). XR headset 2304 includes a depth detection sensor, such as a range-finding system, that detects positions of points on objects 2306 at location 2302. A data source of XR headset 2304 may use the signals generated by the depth detection sensor to generate a point cloud representation of objects 2306 at location 2302. XR headset 2304 may include a G-PCC encoder (e.g., G-PCC encoder 200 of FIG. 1) that is configured to encode the point cloud to generate bitstreams 2308. Inter prediction and residual prediction, as described in this disclosure may reduce the size of bitstream 2308.

XR headset 2304 may transmit bitstreams 2308 (e.g., via a network such as the Internet) to an XR headset 2310 worn by a user 2312 at a second location 2314. XR headset 2310 may decode bitstreams 2308 to reconstruct the point cloud. XR headset 2310 may use the point cloud to generate an XR visualization (e.g., an AR, MR, VR visualization) representing objects 2306 at location 2302. Thus, in some examples, such as when XR headset 2310 generates an VR visualization, user 2312 may have a 3D immersive experience of location 2302. In some examples, XR headset 2310 may determine a position of a virtual object based on the reconstructed point cloud. For instance, XR headset 2310 may determine, based on the reconstructed point cloud, that an environment (e.g., location 2302) includes a flat surface and then determine that a virtual object (e.g., a cartoon character) is to be positioned on the flat surface. XR headset 2310 may generate an XR visualization in which the virtual object is at the determined position. For instance, XR headset 2310 may show the cartoon character sitting on the flat surface.

Figure 24:
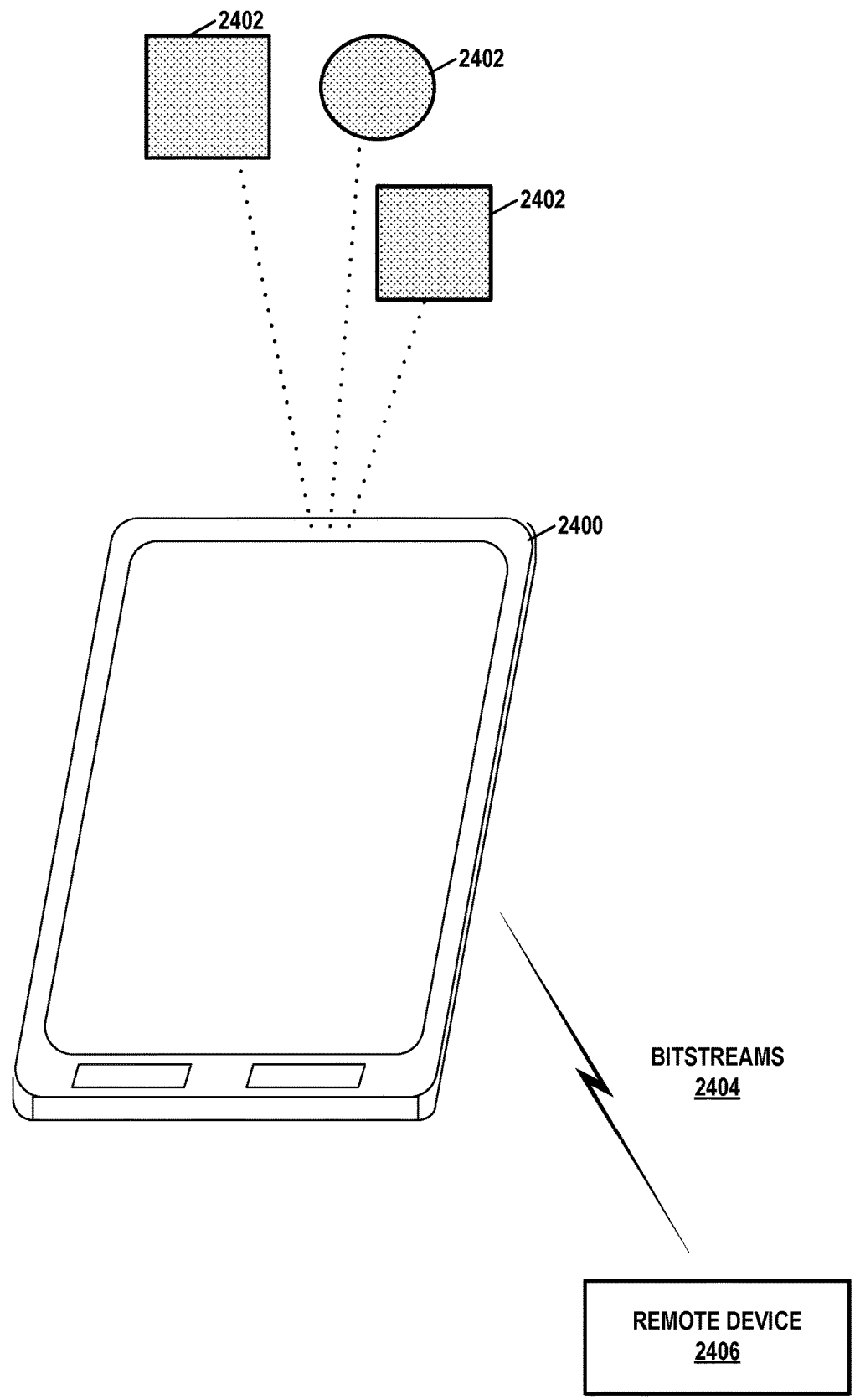
FIG. 24 is a conceptual diagram illustrating an example mobile device system in which one or more techniques of this disclosure may be used.

FIG. 24 is a conceptual diagram illustrating an example mobile device system in which one or more techniques of this disclosure may be used. In the example of FIG. 24, a mobile device 2400 (e.g., a wireless communication device), such as a mobile phone or tablet computer, includes a range-finding system, such as a LIDAR system, that detects positions of points on objects 2402 in an environment of mobile device 2400. A data source of mobile device 2400 may use the signals generated by the depth detection sensor to generate a point cloud representation of objects 2402. Mobile device 2400 may include a G-PCC encoder (e.g., G-PCC encoder 200 of FIG. 1) that is configured to encode the point cloud to generate bitstreams 2404. In the example of FIG. 24, mobile device 2400 may transmit bitstreams to a remote device 2406, such as a server system or other mobile device. Inter prediction and residual prediction, as described in this disclosure may reduce the size of bitstreams 2404. Remote device 2406 may decode bitstreams 2404 to reconstruct the point cloud. Remote device 2406 may use the point cloud for various purposes. For example, remote device 2406 may use the point cloud to generate a map of environment of mobile device 2400. For instance, remote device 2406 may generate a map of an interior of a building based on the reconstructed point cloud. In another example, remote device 2406 may generate imagery (e.g., computer graphics) based on the point cloud. For instance, remote device 2406 may use points of the point cloud as vertices of polygons and use color attributes of the points as the basis for shading the polygons. In some examples, remote device 2406 may use the reconstructed point cloud for facial recognition or other security applications.

Examples in the various aspects of this disclosure may be used individually or in any combination.

The following is a non-limiting list of aspects in accordance with one or more techniques of this disclosure.

Aspect 1A: A method of encoding or decoding a point cloud data includes generating a prediction for a point of the point cloud data based on one or more intra predictor points and one or more inter predictor points; and encoding or decoding the point based on the prediction for the point.

Aspect 2A: The method of aspect 1A, wherein generating the prediction for the point comprises: determining at least a first dimension of the predictor using intra prediction; and determining at least a second dimension of the predictor using inter prediction.

Aspect 3A: The method of aspect 2A, wherein the first and second dimensions are different ones of a radius, an azimuth, and a laser identifier.

Aspect 4A: A method of encoding or decoding point cloud data includes obtaining a mixed reference frame based on one or more reference frames; adding a point in the mixed reference frame for a point in a reference frame of the one or more reference frames; performing inter prediction using the added point to generate a prediction for a point of the point cloud data; and encoding or decoding the point based on the prediction for the point.

Aspect 5A: The method of aspect 4A, wherein obtaining the mixed reference frame comprises determining a reference picture for each dimension of a point coordinate system.

Aspect 6A: A method of encoding or decoding point cloud data includes deriving a predictor from a reference picture and a predictor type; and determining, based on the predictor, an inter residual value for a point of a current point cloud frame of the point cloud data.

Aspect 7A: The method of aspect 6A, further includes signaling the inter residual value in a bitstream.

Aspect 8A: The method of aspects 6A or 7A, further comprising decoding the point based on the inter residual value.

Aspect 9A: The method of any of aspects 6A-8A, updating an inter residual value buffer based on the inter residual value for the point for each reference picture and predictor type.

Aspect 10A: The method of any of aspects 6A-9A, wherein an inter prediction mode used for coding the point is specified in a bitstream.

Aspect 11A: A method of encoding or decoding point cloud data includes determining a mode to encode or decode a position of a point; determining a reference picture associated with the mode; determining a predictor value for the point; and determining a residual predictor value for the point.

Aspect 12A: The method of aspect 11A, further includes determining a residual using the position of the point, the predictor value, and the residual predictor value; and encoding the residual in a bitstream.

Aspect 13A: The method of any of aspects 11A or 12A, further includes decoding the residual; and reconstructing the position of the point based on the residual, the predictor value, and the residual predictor value.

Aspect 14A: A method of encoding or decoding a point cloud comprising any combination of aspects 1A-13A.

Aspect 15A: The method of any of aspects 1A-14A, further comprising generating the point cloud data.

Aspect 16A: A device for processing a point cloud, the device comprising one or more means for performing the method of any of aspects 1A-15A.

Aspect 17A: The device of aspect 16A, wherein the one or more means comprise one or more processors implemented in circuitry.

Aspect 18A: The device of any of aspects 16A or 17A, further comprising a memory to store the point cloud data.

Aspect 19A: The device of any of aspects 16A-18A, wherein the device comprises a decoder.

Aspect 20A: The device of any of aspects 16A-19A, wherein the device comprises an encoder.

Aspect 21A: The device of any of aspects 16A-20A, further comprising a device to generate the point cloud data.

Aspect 22A: The device of any of aspects 16A-21A, further comprising a display to present imagery based on the point cloud data.

Aspect 23A: A computer-readable storage medium having stored thereon instructions that, when executed, cause one or more processors to perform the method of any of aspects 1A-15A.

Aspect 1B: A device for decoding point cloud data includes a memory configured to store the point cloud data; and one or more processors implemented in circuitry and coupled to the memory, the one or more processors configured to: generate a predictor for a current point of a current frame of the point cloud data, wherein the predictor for the current point is a prediction of a location of the current point and the one or more processors are configured to, as part of generating the predictor for the current point, for each respective dimension of a plurality of dimensions of a point coordinate system: identify a reference position for the respective dimension, wherein: the reference position for the respective dimension is a position in a reference frame for the respective dimension, and the reference frame for the respective dimension and a reference frame for at least one other dimension in the plurality of dimensions are different reference frames in a plurality of reference frames; and identify an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and decode the current point based on the predictor for the current point.

Aspect 2B: The device of aspect 1B, wherein: the reference position for the respective dimension is a position in a reference frame for the respective dimension and has a laser identifier and a scaled azimuth matching a laser identifier and an azimuth of a previous point in the current frame, wherein the previous point was decoded previous to the current point, and the inter predictor for the respective dimension has a scaled azimuth greater than the scaled azimuth of the reference position for the respective dimension.

Aspect 3B: The device of any of aspects 1B and 2B, wherein the plurality of reference frames includes a zero-compensated reference frame and a global motion compensated reference frame or a mixed reference frame.

Aspect 4B: The device of any of aspects 1B through 3B, wherein: the plurality of dimensions includes two or more of a radius dimension, an azimuth dimension, or a laser identifier dimension, the plurality of dimensions includes two or more of an x dimension, a y dimension, or a z dimension, or the plurality of dimensions includes two or more of an r dimension, a phi dimension, or a theta dimension.

Aspect 5B: The device of any of aspects 1B through 4B, wherein the one or more processors are configured to, as part of identifying the inter predictor for the respective dimension: determine the inter predictor for the respective dimension as a first next point, wherein the first next point is a point in the reference frame for the respective dimension having a scaled azimuth greater than a scaled azimuth of the reference position for the respective dimension, or determine the inter predictor for the respective dimension as a second next point, wherein the second next point is a point in the reference frame for the respective dimension having a scaled azimuth greater than the scaled azimuth of the first next point.

Aspect 6B: The device of aspect 5B, wherein the one or more processors are further configured to obtain a mode indication signaled in a bitstream that indicates an inter prediction mode for the current point, wherein the inter predictor for the respective dimension is the first next point or the second next point depending on the inter prediction mode for the current point.

Aspect 7B: The device of any of aspects 1B through 6B, wherein: the one or more processors are further configured to: generate a residual predictor for the current point; and obtain residual data for the current point based on data signaled in a bitstream, and the one or more processors are configured to decode the current point based on the predictor for the current point, the residual predictor for the current point, and the residual data for the current point.

Aspect 8B: The device of aspect 7B, wherein: the one or more processors are configured to, as part of generating the residual predictor for the current point: determine a predictor for a previous point in the current frame, wherein the previous point was decoded previous to the current point; and determine the residual predictor for the current point based on the predictor for the previous point and a position of the previous point.

Aspect 9B: The device of any of aspects 1B through 8B, wherein: the predictor for the current point is a first predictor for the current point, and the one or more processors are further configured to: generate an inter prediction candidate list that includes a plurality of inter prediction candidates, wherein: the inter prediction candidates include the predictor for the current point, each of the inter prediction candidates includes a predictor for each of the dimensions, the predictor for the dimension is a combination of: a reference picture, a prediction type in a plurality of prediction types, and a residual prediction order, and generating the inter prediction candidate list includes generating the first predictor for the current point.

Aspect 10B: The device of aspect 9B, wherein the prediction types include one or more inter prediction types and one or more intra prediction types.

Aspect 11B: The device of any of aspects 1B through 10B, wherein: the current point is a first current point of the current frame, and the one or more processors are further configured to: generate a predictor for a second current point of the current frame of the point cloud data based on one or more intra predictor points and one or more inter predictor points; and decode the second current point based on the predictor for the second current point.

Aspect 12B: The device of aspect 11B, wherein the one or more processors are configured to, as part of generating the predictor for the second current point: determine at least a first dimension of the predictor using intra prediction; and determine at least a second dimension of the predictor using inter prediction.

Aspect 13B: The method of any of aspects 1B through 12B, further comprising a display to present imagery based on the point cloud data.

Aspect 14B: A device for encoding point cloud data includes a memory configured to store the point cloud data; and one or more processors implemented in circuitry and coupled to the memory, the one or more processors configured to: generate a predictor for a current point of a current frame of the point cloud data, wherein the one or more processors are configured to, as part of generating the predictor for the current point, for each respective dimension of a plurality of dimensions of a point coordinate system: identify a reference position for the respective dimension, wherein: the reference position for the respective dimension is a position in a reference frame for the respective dimension, and the reference frame for the respective dimension and a reference frame for at least one other dimension in the plurality of dimensions are different reference frames in a plurality of reference frames; and identify an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and encode the current point based on the predictor for the current point.

Aspect 15B: The device of aspect 14B, wherein: the reference position for the respective dimension is a position in a reference frame for the respective dimension and has a laser identifier and a scaled azimuth matching a laser identifier and an azimuth of a previous point in the current frame, wherein the previous point was decoded previous to the current point, and the inter predictor for the respective dimension has a scaled azimuth greater than the scaled azimuth of the reference position for the respective dimension.

Aspect 16B: The device of any of aspects 14B and 15B, wherein the plurality of reference frames includes a zero-compensated reference frame and a global motion compensated reference frame.

Aspect 17B: The device of any of aspects 14B through 16B, wherein: the plurality of dimensions includes two or more of a radius dimension, an azimuth dimension, or a laser identifier dimension, the plurality of dimensions includes two or more of an x dimension, a y dimension, or a z dimension, or the plurality of dimensions includes two or more of an r dimension, a phi dimension, or a theta dimension.

Aspect 18B: The device of any of aspects 14B through 17B, wherein the one or more processors are configured to, as part of identifying the inter predictor for the respective dimension: determine the inter predictor for the respective dimension as a first next point, wherein the first next point is a point in the reference frame for the respective dimension having a scaled azimuth greater than a scaled azimuth of the reference position for the respective dimension, or determine the inter predictor for the respective dimension as a second next point, wherein the second next point is a point in the reference frame for the respective dimension having a scaled azimuth greater than the scaled azimuth of the first next point.

Aspect 19B: The device of aspect 18B, wherein the one or more processors are further configured to obtain a mode indication signaled in a bitstream that indicates an inter prediction mode for the current point, wherein the inter predictor for the respective dimension is the first next point or the second next point depending on the inter prediction mode for the current point.

Aspect 20B: The device of any of aspects 14B through 19B, wherein: the one or more processors are further configured to: generate a residual predictor for the current point; and generate residual data for the current point, and the one or more processors are configured to encode the current point based on the predictor for the current point, the residual predictor for the current point, and the residual data for the current point.

Aspect 21B: The device of aspect 20B, wherein: the one or more processors are configured to, as part of generating the residual predictor for the current point: determine a predictor for a previous point in the current frame, wherein the previous point was decoded previous to the current point; and determine the residual predictor for the current point based on the predictor for the previous point and a position of the previous point.

Aspect 22B: The device of any of aspects 14B through 21B, wherein: the predictor for the current point is a first predictor for the current point, and the one or more processors are further configured to: generate an inter prediction candidate list that includes a plurality of inter prediction candidates, wherein: the inter prediction candidates include the predictor for the current point, each of the inter prediction candidates includes a predictor for each of the dimensions, the predictor for the dimension is a combination of: a reference picture, a prediction type in a plurality of prediction types, and a residual prediction order, and the inter prediction candidate list includes the first predictor for the current point.

Aspect 23B: The device of aspect 22B, wherein the prediction types include one or more inter prediction types and one or more intra prediction types.

Aspect 24B: The device of any of aspects 14B through 23B, wherein: the current point is a first current point of the current frame, and the one or more processors are further configured to: generate a predictor for a second current point of the current frame of the point cloud data based on one or more intra predictor points and one or more inter predictor points; and encode the second current point based on the predictor for the second current point.

Aspect 25B: The device of aspect 24B, wherein the one or more processors are configured to, as part of generating the predictor for the second current point: determine at least a first dimension of the predictor using intra prediction; and determine at least a second dimension of the predictor using inter prediction.

Aspect 26B: The device of any of aspects 14B through 25B, wherein device is configured to generate the point cloud data.

Aspect 27B: A method of decoding point cloud data includes generating a predictor for a current point of a current frame of the point cloud data, wherein generating the predictor for the current point comprises, for each respective dimension of a plurality of dimensions of a point coordinate system: identifying a reference position for the respective dimension, wherein: the reference position for the respective dimension is a position in a reference frame for the respective dimension, and the reference frame for the respective dimension and a reference frame for at least one other dimension in the plurality of dimensions are different reference frames in a plurality of reference frames; and identifying an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and decoding the current point based on the predictor for the current point.

Aspect 28B: The method of aspect 27B, wherein: the method further comprises: generating a residual predictor for the current point; and obtaining residual data for the current point based on data signaled in a bitstream, and decoding the current point comprises decoding the current point based on the predictor for the current point, the residual predictor for the current point, and the residual data for the current point.

Aspect 29B: The method of any of aspects 27B and 28B, wherein: the current point is a first current point of the current frame, and the method further comprises: generating a predictor for a second current point of the current frame of the point cloud data based on one or more intra predictor points and one or more inter predictor points; and decoding the second current point based on the predictor for the second current point.

Aspect 30B: A method of encoding point cloud data includes generating a predictor for a current point of a current frame of the point cloud data, wherein the one or more processors are configured to, as part of generating the predictor for the current point, for each respective dimension of a plurality of dimensions of a point coordinate system: identify a reference position for the respective dimension, wherein: the reference position for the respective dimension is a position in a reference frame for the respective dimension, and the reference frame for the respective dimension and a reference frame for at least one other dimension in the plurality of dimensions are different reference frames in a plurality of reference frames; and identify an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and encode the current point based on the predictor for the current point.

Aspect 31B: The method of aspect 30B, wherein: the method further comprises: generating a residual predictor for the current point; and generating residual data for the current point, and encoding the current point comprises encoding the current point based on the predictor for the current point, the residual predictor for the current point, and the residual data for the current point.

Aspect 32B: The method of any of aspects 30B and 31B, wherein: the current point is a first current point of the current frame, and the method further comprises: generating a predictor for a second current point of the current frame of the point cloud data based on one or more intra predictor points and one or more inter predictor points; and encoding the second current point based on the predictor for the second current point.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding point cloud data, the device comprising:
   a memory configured to store the point cloud data; and
   one or more processors implemented in circuitry and coupled to the memory, the one or more processors configured to:
      generate a predictor for a current point of a current frame of the point cloud data, wherein the predictor for the current point is a prediction of a location of the current point and the one or more processors are configured to, as part of generating the predictor for the current point, for each respective dimension of a plurality of dimensions of a point coordinate system:
         identify a reference position for the respective dimension, wherein:
            the reference position for the respective dimension is a position in a reference frame for the respective dimension, and
            the reference frame for the respective dimension and a reference frame for at least one other dimension in the plurality of dimensions are different reference frames in a plurality of reference frames; and
         identify an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and
      decode the current point based on the predictor for the current point.

2. The device of claim 1, wherein:
   the reference position for the respective dimension is a position in a reference frame for the respective dimension and has a laser identifier and a scaled azimuth matching a laser identifier and an azimuth of a previous point in the current frame, wherein the previous point was decoded previous to the current point, and
   the inter predictor for the respective dimension has a scaled azimuth greater than the scaled azimuth of the reference position for the respective dimension.

3. The device of claim 1, wherein the plurality of reference frames includes a zero-compensated reference frame and a global motion compensated reference frame or a mixed reference frame.

4. The device of claim 1, wherein:
   the plurality of dimensions includes two or more of a radius dimension, an azimuth dimension, or a laser identifier dimension,
   the plurality of dimensions includes two or more of an x dimension, a y dimension, or a z dimension, or
   the plurality of dimensions includes two or more of an r dimension, a phi dimension, or a theta dimension.

5. The device of claim 1, wherein the one or more processors are configured to, as part of identifying the inter predictor for the respective dimension:
   determine the inter predictor for the respective dimension as a first next point, wherein the first next point is a point in the reference frame for the respective dimension having a scaled azimuth greater than a scaled azimuth of the reference position for the respective dimension, or
   determine the inter predictor for the respective dimension as a second next point, wherein the second next point is a point in the reference frame for the respective dimension having a scaled azimuth greater than the scaled azimuth of the first next point.

6. The device of claim 5, wherein the one or more processors are further configured to obtain a mode indication signaled in a bitstream that indicates an inter prediction mode for the current point, wherein the inter predictor for the respective dimension is the first next point or the second next point depending on the inter prediction mode for the current point.

7. The device of claim 1, wherein:
   the one or more processors are further configured to:
      generate a residual predictor for the current point; and
      obtain residual data for the current point based on data signaled in a bitstream, and
   the one or more processors are configured to decode the current point based on the predictor for the current point, the residual predictor for the current point, and the residual data for the current point.

8. The device of claim 7, wherein:
   the one or more processors are configured to, as part of generating the residual predictor for the current point:
      determine a predictor for a previous point in the current frame, wherein the previous point was decoded previous to the current point; and determine the residual predictor for the current point based on the predictor for the previous point and a position of the previous point.

9. The device of claim 1, wherein:
the predictor for the current point is a first predictor for the current point, and
the one or more processors are further configured to:
generate an inter prediction candidate list that includes a plurality of inter prediction candidates, wherein:
the inter prediction candidates include the predictor for the current point,
each of the inter prediction candidates includes a predictor for each of the dimensions,
the predictor for the dimension is a combination of:
a reference picture, a prediction type in a plurality of prediction types, and a residual prediction order, and
generating the inter prediction candidate list includes generating the first predictor for the current point.

10. The device of claim 9, wherein the prediction types include one or more inter prediction types and one or more intra prediction types.

11. The device of claim 1, wherein:
the current point is a first current point of the current frame, and
the one or more processors are further configured to:
generate a predictor for a second current point of the current frame of the point cloud data based on one or more intra predictor points and one or more inter predictor points; and
decode the second current point based on the predictor for the second current point.

12. The device of claim 11, wherein the one or more processors are configured to, as part of generating the predictor for the second current point:
determine at least a first dimension of the predictor using intra prediction; and
determine at least a second dimension of the predictor using inter prediction.

13. The device of claim 1, further comprising a display to present imagery based on the point cloud data.

14. A device for encoding point cloud data, the device comprising:
a memory configured to store the point cloud data; and
one or more processors implemented in circuitry and coupled to the memory, the one or more processors configured to:
generate a predictor for a current point of a current frame of the point cloud data, wherein the one or more processors are configured to, as part of generating the predictor for the current point, for each respective dimension of a plurality of dimensions of a point coordinate system:
identify a reference position for the respective dimension, wherein:
the reference position for the respective dimension is a position in a reference frame for the respective dimension, and
the reference frame for the respective dimension and a reference frame for at least one other dimension in the plurality of dimensions are different reference frames in a plurality of reference frames; and
identify an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and
encode the current point based on the predictor for the current point.

15. The device of claim 14, wherein:
the reference position for the respective dimension is a position in a reference frame for the respective dimension and has a laser identifier and a scaled azimuth matching a laser identifier and an azimuth of a previous point in the current frame, wherein the previous point was decoded previous to the current point, and
the inter predictor for the respective dimension has a scaled azimuth greater than the scaled azimuth of the reference position for the respective dimension.

16. The device of claim 14, wherein the plurality of reference frames includes a zero-compensated reference frame and a global motion compensated reference frame.

17. The device of claim 14, wherein:
the plurality of dimensions includes two or more of a radius dimension, an azimuth dimension, or a laser identifier dimension,
the plurality of dimensions includes two or more of an x dimension, a y dimension, or a z dimension, or
the plurality of dimensions includes two or more of an r dimension, a phi dimension, or a theta dimension.

18. The device of claim 14, wherein the one or more processors are configured to, as part of identifying the inter predictor for the respective dimension:
determine the inter predictor for the respective dimension as a first next point, wherein the first next point is a point in the reference frame for the respective dimension having a scaled azimuth greater than a scaled azimuth of the reference position for the respective dimension, or
determine the inter predictor for the respective dimension as a second next point, wherein the second next point is a point in the reference frame for the respective dimension having a scaled azimuth greater than the scaled azimuth of the first next point.

19. The device of claim 18, wherein the one or more processors are further configured to obtain a mode indication signaled in a bitstream that indicates an inter prediction mode for the current point, wherein the inter predictor for the respective dimension is the first next point or the second next point depending on the inter prediction mode for the current point.

20. The device of claim 14, wherein:
the one or more processors are further configured to:
generate a residual predictor for the current point; and
generate residual data for the current point, and
the one or more processors are configured to encode the current point based on the predictor for the current point, the residual predictor for the current point, and the residual data for the current point.

21. The device of claim 20, wherein:
the one or more processors are configured to, as part of generating the residual predictor for the current point:
determine a predictor for a previous point in the current frame, wherein the previous point was decoded previous to the current point; and
determine the residual predictor for the current point based on the predictor for the previous point and a position of the previous point.

22. The device of claim 14, wherein:
the predictor for the current point is a first predictor for the current point, and
the one or more processors are further configured to:
generate an inter prediction candidate list that includes a plurality of inter prediction candidates, wherein:
the inter prediction candidates include the predictor for the current point,
each of the inter prediction candidates includes a predictor for each of the dimensions,
the predictor for the dimension is a combination of: a reference picture, a prediction type in a plurality of prediction types, and a residual prediction order, and
the inter prediction candidate list includes the first predictor for the current point.

23. The device of claim 22, wherein the prediction types include one or more inter prediction types and one or more intra prediction types.

24. The device of claim 14, wherein:
the current point is a first current point of the current frame, and
the one or more processors are further configured to:
generate a predictor for a second current point of the current frame of the point cloud data based on one or more intra predictor points and one or more inter predictor points; and
encode the second current point based on the predictor for the second current point.

25. The device of claim 24, wherein the one or more processors are configured to, as part of generating the predictor for the second current point:
determine at least a first dimension of the predictor using intra prediction; and
determine at least a second dimension of the predictor using inter prediction.

26. The device of claim 14, wherein device is configured to generate the point cloud data.

27. A method of decoding point cloud data, the method comprising:
generating a predictor for a current point of a current frame of the point cloud data, wherein generating the predictor for the current point comprises, for each respective dimension of a plurality of dimensions of a point coordinate system:
identifying a reference position for the respective dimension, wherein:
the reference position for the respective dimension is a position in a reference frame for the respective dimension, and
the reference frame for the respective dimension and a reference frame for at least one other dimension in the plurality of dimensions are different reference frames in a plurality of reference frames; and
identifying an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and
decoding the current point based on the predictor for the current point.

28. The method of claim 27, wherein:
the method further comprises:
generating a residual predictor for the current point; and
obtaining residual data for the current point based on data signaled in a bitstream, and
decoding the current point comprises decoding the current point based on the predictor for the current point, the residual predictor for the current point, and the residual data for the current point.

29. The method of claim 27, wherein:
the current point is a first current point of the current frame, and
the method further comprises:
generating a predictor for a second current point of the current frame of the point cloud data based on one or more intra predictor points and one or more inter predictor points; and
decoding the second current point based on the predictor for the second current point.

30. A method of encoding point cloud data, the method comprising:
generating a predictor for a current point of a current frame of the point cloud data, wherein generating the predictor for the current point comprises, for each respective dimension of a plurality of dimensions of a point coordinate system:
identifying a reference position for the respective dimension, wherein:
the reference position for the respective dimension is a position in a reference frame for the respective dimension, and
the reference frame for the respective dimension and a reference frame for at least one other dimension in the plurality of dimensions are different reference frames in a plurality of reference frames; and
identifying an inter predictor for the respective dimension based on the reference position for the respective dimension, wherein the inter predictor for the respective dimension is a point in the reference frame for the respective dimension, wherein the predictor for the current point has a coordinate value in the respective dimension corresponding to a coordinate value in the respective dimension of the inter predictor for the respective dimension; and
encoding the current point based on the predictor for the current point.

* * * * *